(12) United States Patent
Tsujita et al.

(10) Patent No.: US 8,845,208 B2
(45) Date of Patent: Sep. 30, 2014

(54) OPTICAL CONNECTOR AND METHOD OF MANUFACTURING SAME

(75) Inventors: Yuichi Tsujita, Ibaraki (JP); Yusuke Shimizu, Ibaraki (JP); Ryusuke Naito, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 330 days.

(21) Appl. No.: 13/275,484

(22) Filed: Oct. 18, 2011

(65) Prior Publication Data

US 2012/0134630 A1 May 31, 2012

(30) Foreign Application Priority Data

Nov. 25, 2010 (JP) ................. 2010-263012

(51) Int. Cl.
*G02B 6/36* (2006.01)
*G02B 6/38* (2006.01)
*G02B 6/138* (2006.01)

(52) U.S. Cl.
CPC ............ *G02B 6/3885* (2013.01); *G02B 6/3865* (2013.01); *G02B 6/138* (2013.01); *G02B 6/389* (2013.01); *G02B 6/3893* (2013.01)
USPC .................. 385/78; 385/59; 385/60

(58) Field of Classification Search
USPC ............................ 385/59, 60, 72, 78, 129–132
See application file for complete search history.

(56) References Cited

U.S. PATENT DOCUMENTS

| | | | |
|---|---|---|---|
| 5,414,786 A * | 5/1995 | Ohta et al. ...................... | 385/63 |
| 5,583,958 A * | 12/1996 | Yanagawa et al. .............. | 385/24 |
| 6,287,017 B1 * | 9/2001 | Katsura et al. .................. | 385/59 |
| 6,445,857 B1 | 9/2002 | Korenaga et al. | |
| 6,964,527 B2 * | 11/2005 | Sasaki et al. .................... | 385/88 |
| 7,295,743 B2 * | 11/2007 | Yatsuda et al. ................ | 385/129 |

(Continued)

FOREIGN PATENT DOCUMENTS

| JP | 04-253004 A | 9/1992 |
|---|---|---|
| JP | 2001-337246 A | 12/2001 |

(Continued)

OTHER PUBLICATIONS

Japanese Office Action dated Jun. 18, 2013, issued in corresponding Japanese Patent Application No. 2010-263012, with English translation (6 pages).

(Continued)

*Primary Examiner* — Daniel Petkovsek
(74) *Attorney, Agent, or Firm* — Westerman, Hattori, Daniels & Adrian, LLP

(57) ABSTRACT

An optical connector reduced in size and capable of reducing optical coupling losses when optical waveguides are connected to each other, and a method of manufacturing the same are provided. The optical connector comprises: an optical waveguide including cores for transmitting light, an under cladding layer provided under the cores, and an over cladding layer provided over the cores; and a ferrule section for optical connection provided in each end portion of the optical waveguide. Part of at least one of the over cladding layer and the under cladding layer lying in a location corresponding to each end portion of the optical waveguide is thick-walled to become the ferrule section for optical connection. A thin-walled part of the optical connector lying between the ferrule sections is an optical waveguide section. The optical connector requires no additional component as a ferrule, and is made small in size.

9 Claims, 15 Drawing Sheets

(56) References Cited

U.S. PATENT DOCUMENTS

| | | | |
|---|---|---|---|
| 7,806,601 B2* | 10/2010 | Dean et al. | 385/85 |
| 8,554,041 B2* | 10/2013 | Mune et al. | 385/131 |
| 2006/0024012 A1 | 2/2006 | Yatsuda et al. | |
| 2011/0222818 A1* | 9/2011 | Mune et al. | 385/72 |

FOREIGN PATENT DOCUMENTS

| | | |
|---|---|---|
| JP | 2002-040298 A | 2/2002 |
| JP | 2006-039282 A | 2/2006 |
| JP | 2006-071961 A | 3/2006 |
| JP | 2008-191187 A | 8/2008 |
| JP | 2010-197985 A | 9/2010 |

OTHER PUBLICATIONS

Chinese Office Action dated May 6, 2014, issued in corresponding Chinese Patent Application No. 201110358332.3 with English translation (18 pages).

* cited by examiner

FIG. 4A1
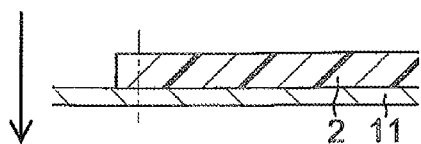
FIG. 4B1
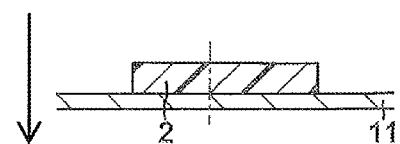
FIG. 4A2
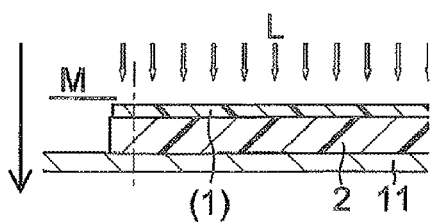
FIG. 4B2
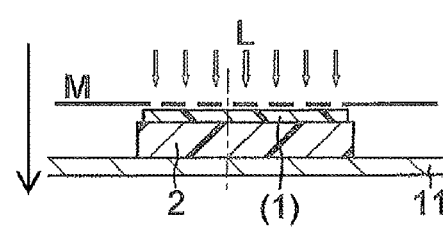
FIG. 4A3
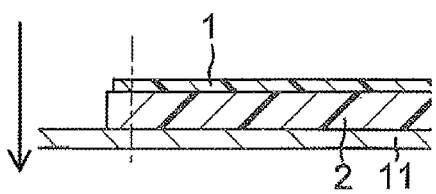
FIG. 4B3
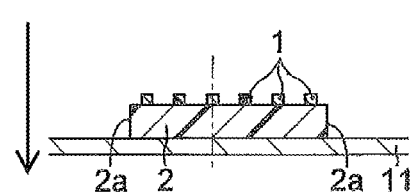
FIG. 4A4
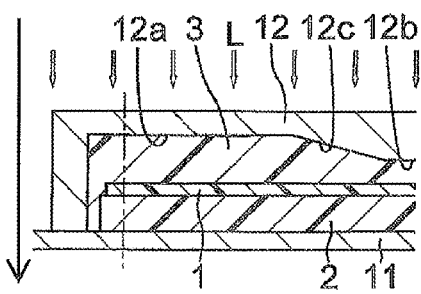
FIG. 4B4
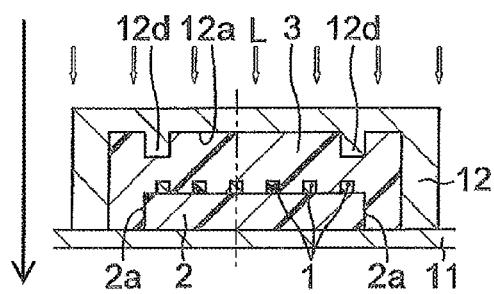

FIG. 4A5
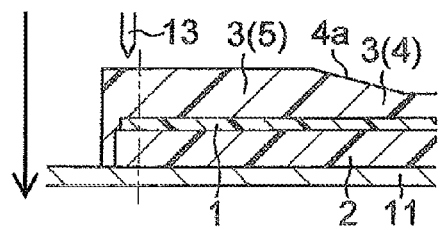
FIG. 4B5
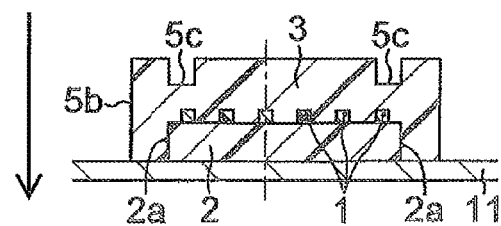
FIG. 4A6
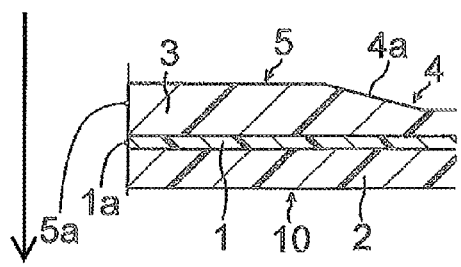
FIG. 4B6
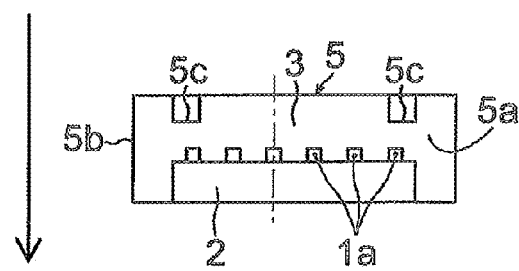

OPTICAL CONNECTOR AND METHOD OF MANUFACTURING SAME

CROSS REFERENCE to RELATED APPLICATIONS

The present application claims priority under 35 U.S.C. §119 to Japanese Patent Application No. 2010-263012, filed Nov. 25, 2010, the contents of which is incorporated herein be reference, in its entirety.

BACKGROUND OF THE INVENTION

1. Field of the Invention

The present invention relates to an optical connector including an optical waveguide for transmitting optical signals and a ferrule for optical connection provided at each end of the optical waveguide, and a method of manufacturing the same.

2. Description of the Related Art

In recent years, an optical interconnection technique which employs flexible polymer optical waveguides for connection between electronic devices and between boards in the devices has been used in place of conventional electrical interconnections.

FIG. 16 shows exemplary optical connectors used for coupling between optical interconnect lines as described above.

Each of the optical connectors shown in FIG. 16 includes an optical connection terminal of a predetermined shape known as a ferrule 100 which is mounted to a longitudinal end portion of a strip-shaped optical waveguide (optical waveguide section) 104. This optical connection ferrule 100 is provided with an optical waveguide fixing through hole or recessed groove. When the strip-shaped optical waveguide 104 inserted into an insertion opening of the through hole on one side is fixed therein, one longitudinal end surface (an optical connection surface) 104a of the strip-shaped optical waveguide 104 is visible or revealed from an exit opening of the through hole on the other side which is provided in a front end surface (coupling surface) 100a of the ferrule 100, and the end surface 104a of the strip-shaped optical waveguide 104 and the end surface 100a of the ferrule 100 are flush with each other, as disclosed in Japanese Published Patent Applications Nos. 2002-40298, 2006-39282, and 2008-191187.

In such an optical connector, guide holes 100b (alignment means) for receiving alignment guide pins 101 therein are provided in predetermined positions of the front end surface (coupling surface) 100a of the ferrule 100. The guide holes 100b are used to establish connection between the optical connectors. Specifically, opposite ends of the guide pins 101 are inserted into the guide holes 100b of two ferrules 100 placed so that the front end surfaces 100a of the respective ferrules 100 are in face-to-face relation with (or opposed to) each other, and the front end surfaces 100a of the respective ferrules 100 are butt-joined to each other. This brings the longitudinal end surfaces (optical connection surfaces) 104a of the respective strip-shaped optical waveguides 104 fixed in the through holes of the two ferrules 100 into abutment with each other, to establish optical connection between the strip-shaped optical waveguides 104. The optical connectors joined together in this manner are prevented from becoming disengaged and are retained by a fastening member, such as a clamp spring 102 and a locking member, prepared separately.

The use of optical interconnection employing optical connectors around CPUs in boards of devices and around chips has started. Around the chips, there is limited space and a large number of optical connectors are used. It has therefore been contemplated to reduce the size and costs of optical connectors as described above.

It is, however, conventional common technical practice to establish connection between strip-shaped optical waveguides by the use of optical connectors including ferrules, as disclosed in Japanese Published Patent Applications Nos. 2002-40298, 2006-39282, and 2008-191187. There are limits to the reduction in the size of optical connectors. An attempt to reduce the size of optical connectors beyond the limits is considered to result in the lowered accuracy of optical connection.

In a conventional optical connector, it is difficult to align a strip-shaped optical waveguide in its proper position within a ferrule when the ferrule is assembled to an end of the optical waveguide. Misalignment resulting from the aforementioned difficulties might cause a drawback such that significant coupling losses are produced when optical waveguides are connected together.

SUMMARY OF THE INVENTION

In view of the foregoing, an optical connector is provided which is small in size and which is capable of reducing optical coupling losses when optical waveguides are connected together. A method of manufacturing the same is also provided.

A first aspect is an optical connector which comprises: an optical waveguide including cores for transmitting light, an under cladding layer provided under the cores, and an over cladding layer provided over the cores; and a ferrule section for optical connection provided at each end portion of the optical waveguide, wherein part of at least one of the over cladding layer and the under cladding layer lying in a location corresponding to each end portion of the optical waveguide is thick-walled to become the ferrule section for optical connection.

A second aspect is a method of manufacturing an optical connector, the optical connector including an optical waveguide, and a ferrule section for optical connection at each end portion of the optical waveguide, the optical waveguide including an under cladding layer, cores having a predetermined pattern and formed on a surface of the under cladding layer, and an over cladding layer covering the under cladding layer and the cores. The method comprises the step of making part of at least one of the over cladding layer and the under cladding layer lying in a location corresponding to each end portion of the optical waveguide thick-walled to form the ferrule section for optical connection during the formation of the cladding layer.

An optical connector does not require a ferrule separate from an optical waveguide. Rather, an end portion itself of the optical waveguide is formed as a ferrule.

In the optical connector, part of at least one of the over cladding layer and the under cladding layer (referred to collectively as "cladding layers" in some cases) of the optical waveguide is thick-walled. This thick-walled part is provided in the form of a ferrule section. Thus, this optical connector requires no additional component as a ferrule, and is small in size. Also, since the end portion of the cladding layer of the optical waveguide serves as the ferrule section, the cores are located automatically in their proper positions relative to the ferrule section. Thus, when ferrule sections similar in structure to each other are placed in face-to-face relation with each other and are caused to coincide in their lateral positions with each other under visual observation as seen in top plan view during the process of butting the front end surfaces thereof against each other, the optical axes of the cores in the ferrule sections automatically coincide with each other.

Preferably, the ferrule section includes coupling means for coupling to a ferrule section of another optical connector. In such an optical connector, the cores are located automatically in their proper positions relative to the coupling means. Thus, during the operation of placing the ferrule sections in face-to-face relation with each other and connecting the front end surfaces of the respective ferrule sections to each other with the coupling means, the use of the coupling means allows automatic alignment between the cores of the ferrule sections. This achieves optical connection with low coupling losses more easily.

Preferably, the ferrule section is a molded part, and is integral with the over cladding layer or the under cladding layer which is similarly a molded part. In such an optical connector, the thick-walled ferrule section in each end portion of the optical waveguide can be formed simultaneously with the (thin-walled) cladding layer covering the optical waveguide cores in a region other than the end portions. This promotes the reduction in costs of the optical connector.

In the method of manufacturing an optical connector, part of at least one of the over cladding layer and the under cladding layer lying in a location corresponding to each end portion of the optical waveguide is made thick-walled during the formation of the cladding layer, whereby the ferrule section for optical connection is formed. Thus, this method requires no additional component as a ferrule, and is capable of forming the ferrule section small in size from a material similar to that of the cladding layer at low costs. Unlike a conventional method, this method does not assemble an optical waveguide in a separate ferrule. This eliminates errors resulting from the assembling operation, and prevents the misalignment of the cores relative to the ferrule section. The method of manufacturing an optical connector is accordingly capable of manufacturing an optical connector with high positional accuracy of cores at low costs.

Preferably, the step of forming the ferrule section is performed by making the over cladding layer thick-walled by the use of a molding method using a mold. In this case, the ferrule section which is thick-walled as compared with regions other than the ferrule section is formed easily with high dimensional accuracy.

Preferably, the step of forming the ferrule section comprises the substeps of: applying a material for the formation of the over cladding layer onto the under cladding layer with the cores formed thereon; putting a mold having an inner mold surface complementary in shape to the surface of the ferrule section over the material for the formation of the over cladding layer while the material is in a semi-cured or uncured state, so that a mold space in the mold is filled with the material; and then curing the material. In such a case, the end portions of the cores are precisely positioned in predetermined place as originally designed in the ferrule section, and product-to-product variations are reduced. Further, when optical connectors including the ferrule sections formed according to the same dimension criteria are placed in face-to-face relation with each other and optically connected to each other, optical coupling losses between the optical connectors are further reduced. This establishes optical interconnection with high quality and with high reliability.

BRIEF DESCRIPTION OF THE DRAWINGS

FIGS. 4A1 to 4A6 and FIGS. 4B1 to 4B6 are views illustrating a method of manufacturing an optical connector according to the present invention.

FIG. 6 is a view schematically illustrating a structure of optical connectors according to a third preferred embodiment of the present invention.

DETAILED DESCRIPTION OF THE INVENTION

Next, preferred embodiments of the present invention will now be described in detail with reference to the drawings.

Figure 1A:
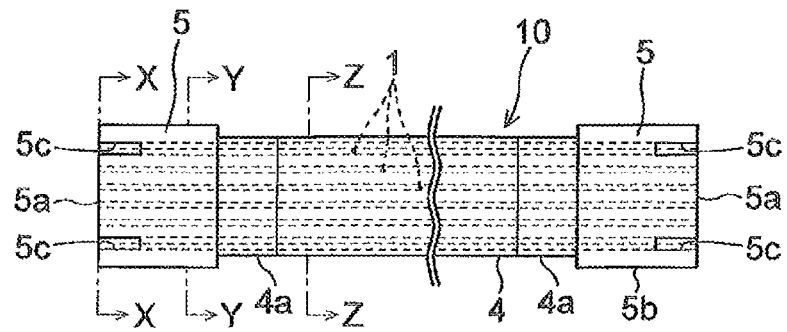
FIGS. 1A to 1D are views schematically illustrating a structure of an optical connector according to a first preferred embodiment of the present invention.
Figure 1B:
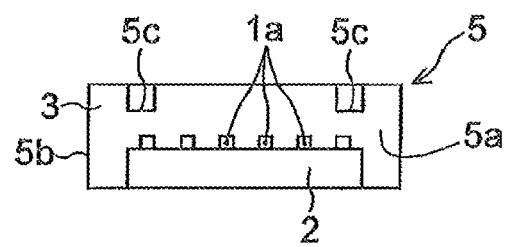
Figure 1C:
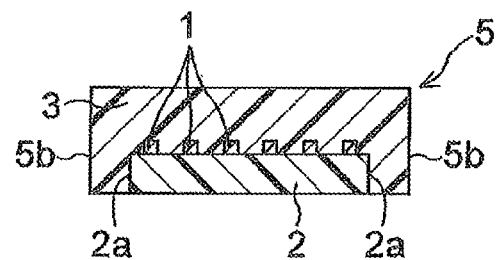
Figure 1D:
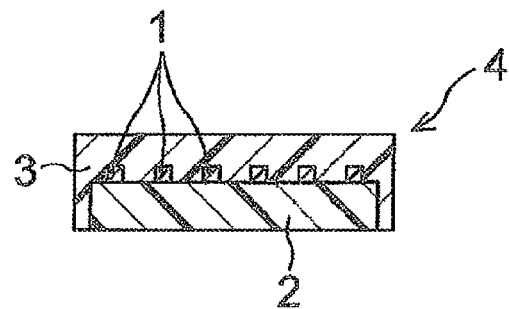

FIGS. 1A to 1D are views schematically illustrating a structure of an optical connector 10 according to a first preferred embodiment. FIG. 1A is a top plan view of the optical connector 10; FIG. 1B is an end view taken along the line X-X of FIG. 1A; FIG. 1C is a sectional view taken along the line Y-Y of FIG. 1A; and FIG. 1D is a sectional view taken along the line Z-Z of FIG. 1A. In the figures, the reference numeral 1 designates cores in an optical waveguide; 2 designates an under cladding layer in the optical waveguide; 3 designates an over cladding layer in the optical waveguide; and 4 designates an entire strip-shaped section (or optical waveguide section) in the optical waveguide.

The optical connector 10 according to the first preferred embodiment, as shown in overall view in FIG. 1A, includes the strip-shaped optical waveguide section 4, and terminal sections (ferrule sections 5) for optical connection which are provided in longitudinal end portions, respectively, of the optical waveguide section 4. The ferrule sections 5 are configured such that the over cladding layer 3 in the optical waveguide section 4 (shown in sectional view in FIG. 1D) is made thick-walled (or increased in thickness) in the longitudinal end portions of the optical waveguide section 4, and are formed integrally with the optical waveguide section 4 by molding (with reference to FIGS. 4A4 and 4B4) using a mold to be described later. Each of the ferrule sections 5 has an upper surface (shown as the front side) provided with alignment grooves 5c (alignment means) used for alignment with other optical connectors.

Figure 2:
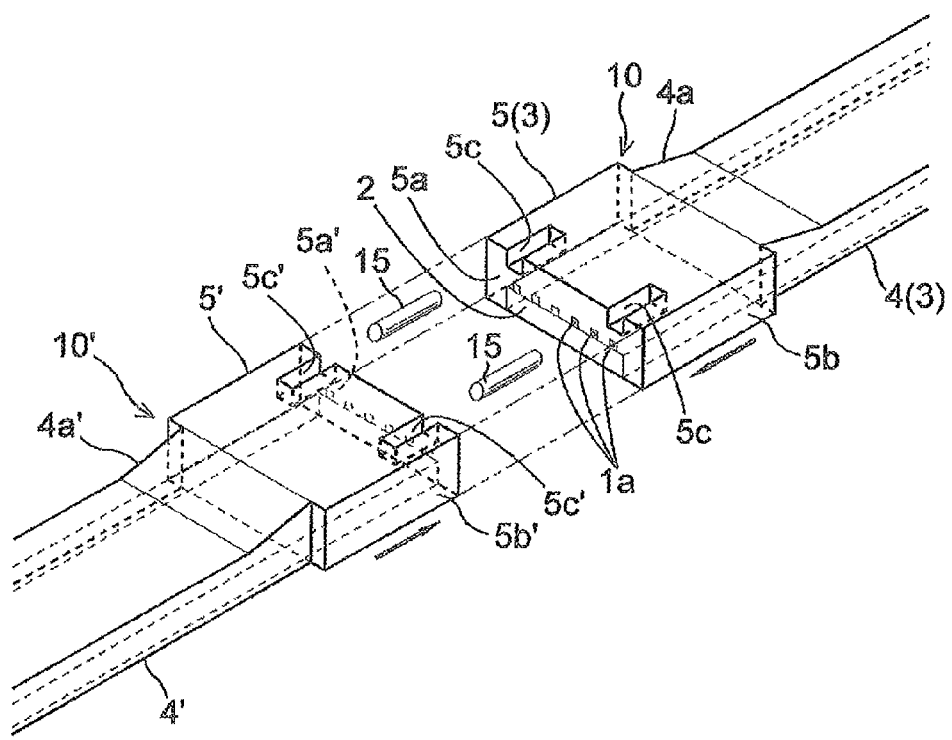
FIGS. 2 and 3 are views illustrating a method of connecting optical connectors to each other according to the first preferred embodiment.
Figure 3:
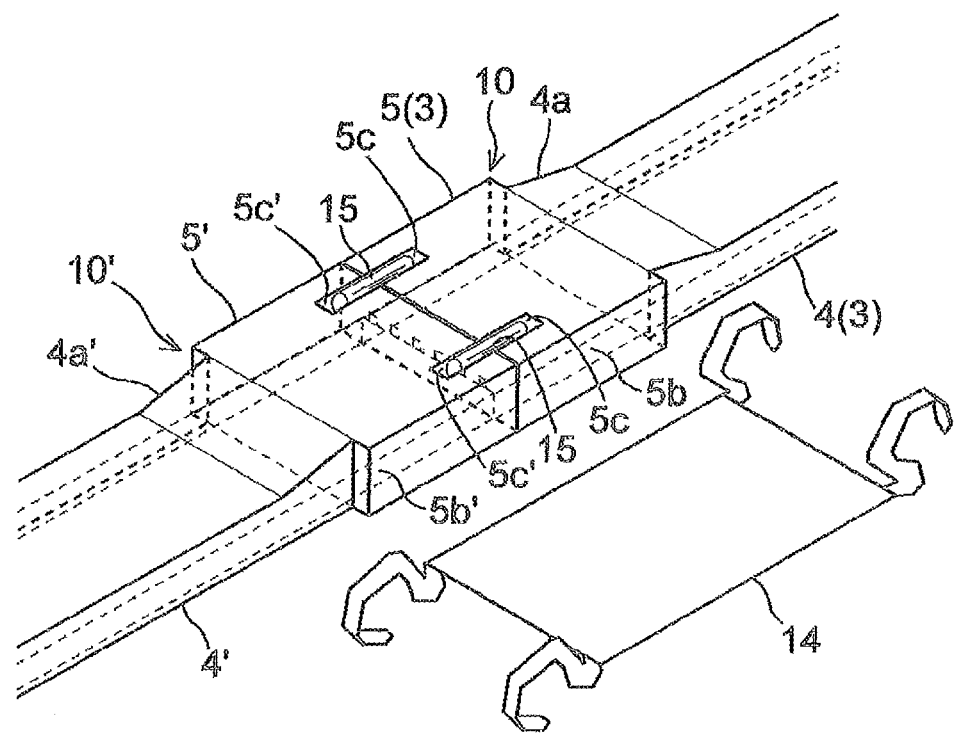

As shown in FIG. 1B, first end surfaces (optical connection surfaces) 1a of the respective cores 1 are exposed or uncovered at a front end surface (coupling surface) 5a of each of the ferrule sections 5. Each ferrule section 5 is connected to a ferrule section 5' of another optical connector 10' in a manner to be described below. As shown in FIGS. 2 and 3, while the ferrule sections 5 and 5' are in face-to-face relation with each other, opposite ends of alignment guide pins 15 (alignment members) are fitted in the alignment grooves 5c and 5c'. In this state, the front end surfaces (coupling surfaces) 5a and 5a' of the respective ferrule sections 5 and 5' are brought closer together into abutment with each other, whereby the optical axes of the cores 1 in the ferrule sections 5 and 5' automatically coincide with each other. Thereafter, a fastening member, such as a clamp spring 14, is used to couple and fix the ferrule sections 5 and 5' (i.e., the optical connectors 10 and 10') to each other. Slopes (tapered sections 4a and 4a') are provided between the ferrule sections 5 and 5' and the corresponding optical waveguide sections 4 and 4' so as to make up for gaps therebetween.

The structure of the optical connector 10 will be described in further detail. The optical connector 10 fundamentally includes a polymer optical waveguide similar to a conventional optical waveguide in film form. As shown in FIGS. 1A to 1D, the polymer optical waveguide includes multiple (in this preferred embodiment, six) cores 1 extending continuously in a longitudinal direction and each having a substantially square cross-sectional configuration, the under cladding layer 2 provided under the cores 1 and having a rectangular cross-sectional configuration, and the over cladding layer 3 covering the cores 1 and the under cladding layer 2.

Part of the over cladding layer 3 lying in each longitudinal end portion is formed by molding to be described later, and serves as a thick-walled ferrule section 5 which covers the cores 1 and opposite side edge surfaces 2a of the under cladding layer 2, as shown in FIG. 1C. Thus, the ferrule section 5 requires no additional component as a ferrule, and is made small in size. Also, the ferrule section 5 is formed integrally with each end portion of the optical waveguide section 4. Thus, the cores 1 are precisely positioned relative to the outline of the ferrule section 5, and are located automatically in their proper positions.

In this preferred embodiment, since the ferrule section 5 is formed integrally with each end portion of the optical waveguide section 4 and the cores 1 are precisely positioned relative to the outline of the ferrule section 5, the operation of alignment between optical connectors 10 may be performed, if necessary, without using an alignment member such as the alignment guide pins 15 as described above (with reference to FIG. 5 according to a second preferred embodiment).

Next, a method of coupling the optical connectors 10 to each other according to the first preferred embodiment will be described.

FIGS. 2 and 3 are views for illustrating the method of connecting the optical connectors 10 (10 and 10') to each other according to the first preferred embodiment. For the connection of the optical connectors 10 and 10', the ferrule sections 5 and 5' of the respective optical connectors 10 and 10' are opposed to each other, and the front end surfaces 5a and 5a' of the respective ferrule sections 5 and 5' are brought into abutment with each other while being aligned with each other.

At this time, the alignment grooves 5c and 5c' and the alignment guide pins 15 are used in this preferred embodiment to achieve optical connection with low coupling losses more easily. The alignment grooves 5c are grooves having a rectangular cross-sectional configuration and open to (communicating with) the front end surface 5a of the ferrule section 5. The alignment grooves 5c are formed in predetermined positions determined in corresponding relation to the end portions (the optical connection surfaces 1a) of the respective cores 1. The width, length and depth of the alignment grooves 5c are set in accordance with the size of the alignment guide pins 15 to be used, and are designed so that the guide pins 15 are fitted in the respective alignment grooves 5c without any space therebetween.

The alignment guide pins 15 are made of an inelastic, relatively hard material such as metal or resin, and have a cross-section sized and configured not to shake (or not to play) in the corresponding alignment grooves 5c, e.g. of a circular or rectangular cross-sectional configuration. The opposite ends of the alignment guide pins 15 are fitted in the alignment grooves 5c and 5c', and the ferrule sections 5 and 5' are brought closer together into abutment with each other, whereby the optical axes of the cores 1 in the ferrule sections 5 and 5' automatically coincide with each other. Alternatively, after ferrule sections 5 and 5 are brought closer together into abutment with each other, the alignment guide pins 15 may be fitted in elongated grooves made up of the alignment grooves 5c and 5c'.

In the optical connectors 10 and 10' aligned and connected together in this manner, the coupling between the ferrule sections 5 and 5' is prevented from becoming disengaged and is retained by a fastening member, such as the clamp spring 14 and a locking member, prepared separately. Thus, the positions of the optical connectors 10 and 10' relative to each other are fixed while the low coupling losses are maintained.

The aforementioned connection may be made firmer when an adhesive or the like is previously applied to the alignment grooves 5c and 5c' (alignment means). The cross-sectional configuration of the alignment grooves 5c and 5c' may be a V-shaped configuration, a U-shaped configuration and the like in addition to the aforementioned rectangular configuration.

Figure 5:
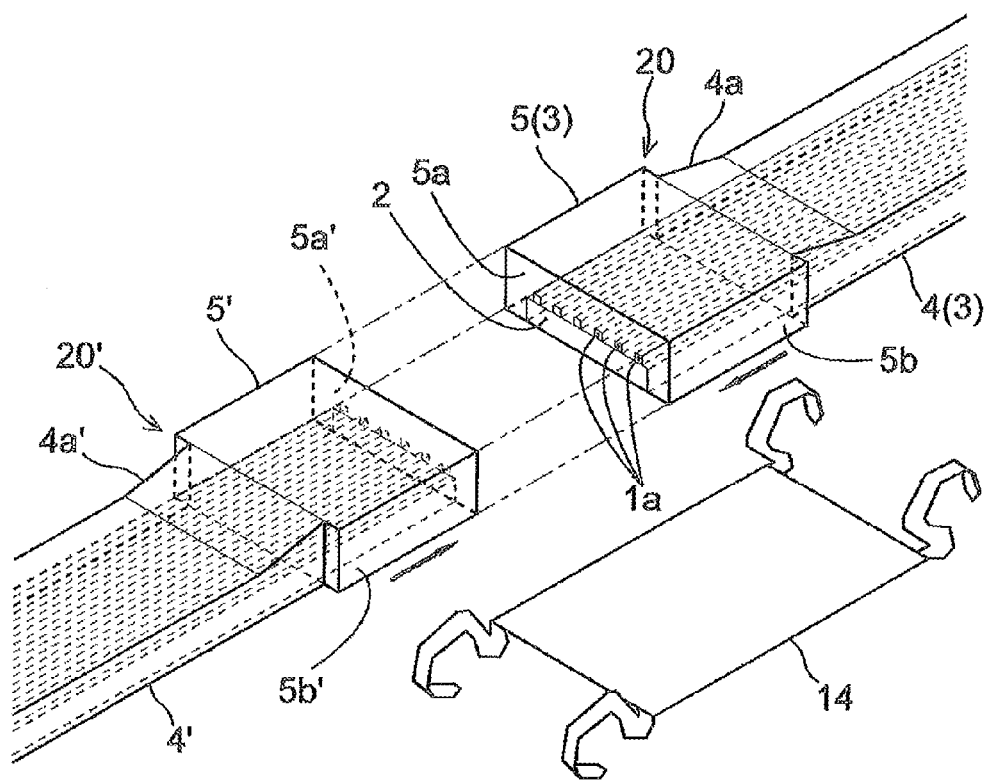
FIG. 5 is a view illustrating a structure of optical connectors and a method of connecting the optical connectors to each other according to a second preferred embodiment of the present invention.

In this preferred embodiment, since the ferrule section 5 is formed integrally with each end portion of the optical waveguide section 4 and the cores 1 are precisely positioned relative to the outline of the ferrule section 5, the operation of alignment between optical connectors 20 and 20' may be performed, if necessary, without using an alignment member such as the alignment guide pins 15 according to the second preferred embodiment shown in FIG. 5. Specifically, even in the case of the optical connectors 20 and 20' which do not include the alignment grooves 5c and 5c', the front end surfaces 5a and 5a' of the respective ferrule sections 5 and 5' are butted against each other, and the portions of lateral side surfaces 5b and 5b' of the ferrule sections 5 and 5' coincide with each other under visual observation, whereby the optical axes of the cores 1 in the ferrule sections 5 and 5' coincide with each other.

Next, a method of manufacturing the optical connector 10 according to the first preferred embodiment will be described.

Figure 6:
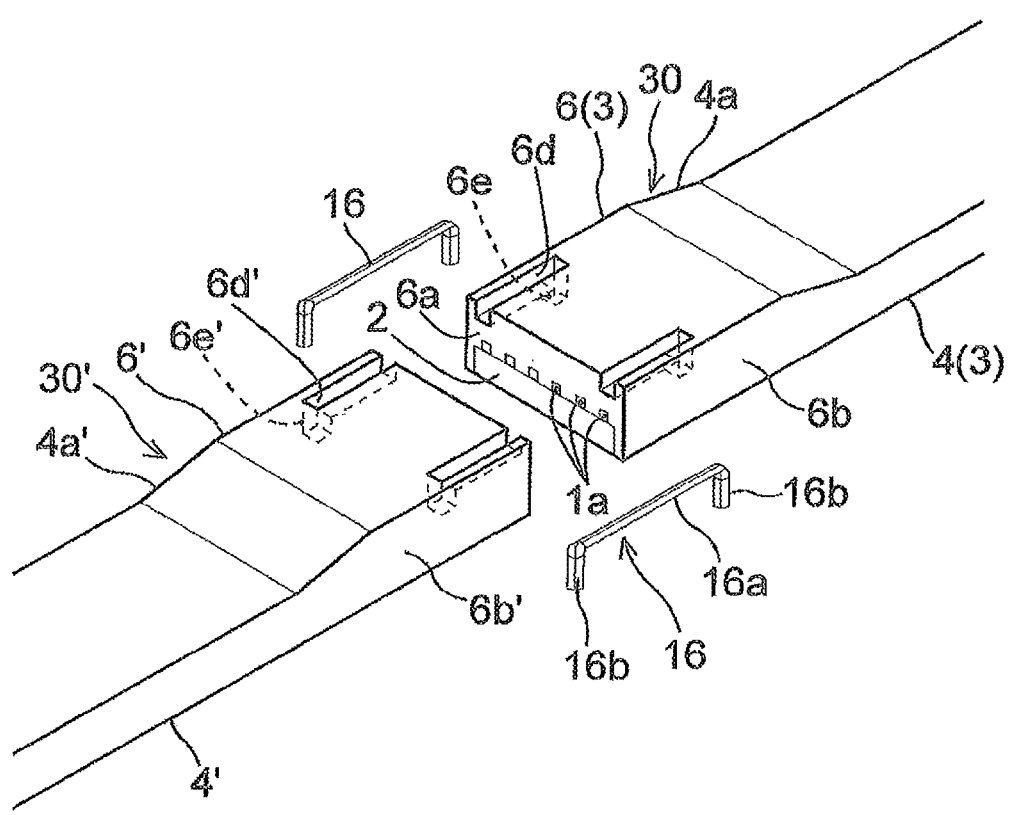

FIGS. 4A1 to 4A6 and FIGS. 4B1 to 4B6 are views illustrating the method of manufacturing the optical connector 10 according to the first preferred embodiment. FIGS. 4A1 to 4A6 are longitudinal sectional views of the ferrule section 5 of the optical connector 10. FIGS. 4B1 to 4B5 are transverse sectional views of the ferrule section 5 of the optical connector 10. FIG. 4B6 is a longitudinal end view of the ferrule section 5 of the optical connector 10. The process steps proceed in the order indicated by the arrows to the left of the figures.

The method of manufacturing the optical connector 10 according to the first preferred embodiment is as follows. First, the under cladding layer 2 of a predetermined width is formed on a substrate 11 such as a glass plate, a resin plate and a metal plate by photolithography, coating and the like.

The under cladding layer 2 is formed in a manner to be described below. Specifically, a varnish including resin is applied onto the substrate 11 by a spin coating method, a dipping method, a die coating method, a roll coating method and the like. Then, the varnish is cured by irradiation with ultraviolet light, a heating treatment, and the like. Thus, the under cladding layer 2 having a predetermined pattern is produced, as shown in FIGS. 4A1 and 4B1.

Next, the cores 1 are formed on the under cladding layer 2 by a photolithographic method using a photosensitive resin and the like. The formation of the cores 1 is as follows. First, as shown in FIGS. 4A2 and 4B2, a material for the formation of the cores 1 (a photosensitive material (1)) is applied onto the under cladding layer 2. Then, using a photomask M (indicated by broken lines) having openings corresponding to the pattern of the cores 1, a photosensitive resin layer for the formation of the cores 1 is irradiated with ultraviolet light indicated by hollow arrows L. Thus, the photosensitive resin layer is exposed in a predetermined pattern to the ultraviolet light. Thereafter, a heating treatment is performed in accordance with the type of photosensitive resin to complete the photoreaction. Thereafter, a development process is performed on the photosensitive resin layer by an immersion method and the like using a developing solution to dissolve away unexposed portions of the photosensitive resin layer. This produces the straight cores 1 as shown in FIGS. 4A3 and 4B3.

Next, after the cores 1 are formed, the over cladding layer 3 is formed by molding as shown in FIGS. 4A4 and 4B4. For the formation of the over cladding layer 3, a material for the formation of the over cladding layer 3 (a liquid photosensitive resin) in amounts required to form the ferrule sections 5 and the optical waveguide section 4 to be described later or more is applied onto the under cladding layer 2 with the cores 1 provided thereon to such an extent as to cover the cores 1 and the under cladding layer 2 and to rise thereabove in slightly greater quantities. Then, the material for the formation of the over cladding layer 3 is put in a semi-cured or uncured state by any method such as heating the material or irradiating the material with ultraviolet light.

Then, a mold 12 for imprinting the ferrule sections 5 and the optical waveguide section 4 is prepared. The mold 12 is put over the material for the formation of the over cladding layer 3 in the semi-cured or uncured state, and pressed toward the substrate 11, so that a mold space in the mold 12 is filled with the material for the formation of the over cladding layer 3, as shown in FIGS. 4A4 and 4B4.

More specifically, as shown in FIG. 4A4, the mold 12 used for the aforementioned molding includes a first inner mold surface 12a complementary in shape to the surface of each of the thick-walled ferrule sections 5, and a second inner mold surface 12b complementary in shape to the surface of the thin-walled optical waveguide section 4. Part of the mold 12 between the first and second inner mold surfaces 12a and 12b is a slope complementary to the tapered section 4a of the optical connector 10. As shown in FIG. 4S4, the mold 12 further includes protruding portions 12d complementary in shape to the alignment grooves 5c.

An open surface at the bottom of the mold 12 is brought into intimate contact with the substrate 11, whereby the space surrounded by the inner mold surfaces of the mold 12 and the surface of the substrate 11 becomes the mold space (or cavity). Parts of the mold space corresponding to the ferrule sections 5 on opposite ends and part of the mold space corresponding to the optical waveguide section 4 lying therebetween are in communication with each other. Thus, parts of the over cladding layer 3 in the ferrule sections 5 and part of the over cladding layer 3 in the optical waveguide section 4 are formed simultaneously and integrally in one molding operation.

In this preferred embodiment, a photosensitive resin is used as the material for the formation of the over cladding layer 3 (liquid resin). For this reason, the mold 12 used herein is made of a material permeable to irradiation light (for example, quartz). Also, the process of curing of resin differs depending on the type of resin. For this reason, when a polyimide resin or the like which is cured by heating treatment is used, a mold made of, for example, quartz resin such as polymethyl methacrylate, and metal is used as the mold 12 in some cases.

Examples of a method of positioning the mold 12 include (1) a positioning method with respect to the cores 1 themselves (the core pattern itself) formed on the under cladding layer 2, and (2) a positioning method with respect to alignment marks formed on the under cladding layer 2 at the same time as the cores 1.

The method of positioning the mold 12 will be described in further detail. In general, materials used for an optical waveguide are transparent to visible light, and an image processing method for use in a conventional photolithographic process (the alignment of a photomask and the like) is applicable to the method of aligning the mold 12. In the case of the aforementioned method (1), for example, the material of the cores 1 has a refractive index generally at least 0.01 higher than that of the material of the under cladding layer 2 and the over cladding layer 3 at a wavelength being used. High-precision alignment is achieved by recognizing the core pattern using this difference in refractive index and by performing binarization using image processing and the like. Of course, the alignment may be performed by operator's visual observation.

When the substrate 11 in the step of producing an optical connector is transparent, the core pattern is accurately recognized by irradiating the back surface of the substrate 11 with light so that the edges (outlines) of the aforementioned core pattern are detected. When the substrate 11 is not transparent, alignment may be performed by directing light from above the core pattern to cause the edges of the pattern to emerge and be recognized. For the positioning with respect to the core pattern, it is preferable to recognize terminal portions, rather than a central portion (a region other than the end portions), of the core pattern because this reduces the risk of misalignment.

In the case of the positioning method (2) with respect to the positioning alignment marks previously formed on the under cladding layer 2 at the same time as the formation of the cores 1, the alignment marks are recognized by the aforementioned image processing, whereby the alignment of the mold 12 is performed. The alignment marks are formed on the photomask M, separately from the core pattern. The alignment marks are formed by a photolithographic method at the same time as the cores 1 during the formation of the cores 1. For this reason, the dimensional and positional accuracy of the alignment marks and the cores 1 relative to each other is typically as high as approximately 0.1 μm. Thus, when the mold 12 is aligned with respect to the alignment marks, the positional accuracy is maintained as high as that obtained using the pattern of the cores 1 themselves as a reference. When the alignment marks are used, it is similarly preferable to place the alignment marks in a peripheral area of the photomask M, rather than near the center of the photomask M. Preferably, the shape of the alignment marks is a symmetrical shape, such as a cross mark and a circle, which is less influenced by orientation during the image recognition.

In this manner, the positioning of the mold 12 is completed, and the mold space (defined by the inner mold surfaces 12a and 12b) in the mold 12 is filled with the material for the formation of the over cladding layer 3. Thereafter, the material is cured to form the over cladding layer 3. When the material for the formation of the over cladding layer 3 is a photosensitive resin, the material is exposed to the irradiation light L such as ultraviolet light through the mold 12 as shown in FIGS. 4A4 and 4B4, and is thereafter subjected to a heating treatment. The heating treatment is performed in accordance with the type of resin. This causes the semi-cured or uncured resin to cure, thereby forming the over cladding layer 3. Then, the mold 12 is removed. This provides the optical connector 10 in which parts corresponding to the longitudinal end portions (front end portions) are formed as the thick-walled ferrule sections 5 and a part lying therebetween is formed as the thin-walled optical waveguide section 4 integrally with the thick-walled ferrule sections 5, as shown in FIGS. 4A5 and 4B5.

The optical waveguide section 4 between the ferrule sections 5 has a thickness generally in the range of 50 to 500 μm, preferably in the range of 70 to 300 μm. The ferrule sections 5 have a thickness generally in the range of 200 to 4000 μm which is greater than the thickness of the optical waveguide section 4, preferably in the range of 500 to 3000 μm.

Then, as shown in FIGS. 4A5 and 4A6, dicing using a cutting edge 13 is performed to cut off the longitudinal end portion of each ferrule section 5. This provides the optical connector 10 in which the longitudinal end surfaces (optical connection surfaces) 1a of the respective cores 1 are exposed or uncovered at the longitudinal end surface (coupling surface) 5a of each ferrule section 5, with reference to FIGS. 4A6 and 4B6. When the end surfaces of the under cladding layer 2, the cores 1 and the over cladding layer 3 are formed so as to be flush with the longitudinal end surface 5a of each ferrule section 5, a cutting process using the aforementioned dicing is not necessary to be performed.

In this manufacturing method, the ferrule sections for optical connection are formed integrally with the over cladding layer 3 in the optical waveguide section 4 by the use of the mold 12 configured such that parts of the over cladding layer 3 corresponding to the end portions of the cores 1 are thick-walled, when the over cladding layer 3 is formed. Thus, the method of manufacturing the optical connector 10 eliminates the need for additional components as conventional ferrules, and is capable of producing the ferrule sections 5 reduced in size at reduced costs from the same material as the over cladding layer 3 of an optical waveguide. Also, this method does not assemble an optical waveguide to ferrules as in the conventional product. This eliminates errors resulting from the assembling operation, and prevents the misalignment of the cores 1 relative to the ferrule sections 5.

In the method of manufacturing the optical connector 10, the mold 12 is positioned with respect to the position of the cores 1 or the alignment marks for positioning. Thus, the end portions of the cores 1 are precisely positioned in a predetermined place as originally designed in the ferrule sections 5. Also, the outside shape of the ferrule sections 5 and the alignment grooves 5c provided in the outside surface thereof are precise in dimension and position relative to the cores 1. This achieves small product-to-product variations. The optical connector 10 is capable of establishing optical interconnection which is low in coupling loss and high in quality and in reliability with high reproducibility.

Part of the over cladding layer 3 in the optical waveguide section 4 is formed simultaneously with parts of the over cladding layer 3 in the ferrule sections 5 by molding in the aforementioned manner. Alternatively, part of the over cladding layer 3 near the middle thereof except the end regions that will become the ferrule sections 5 may be previously formed by a coating method, a photolithographic method and the like similar to those for the under cladding layer 2 before the molding of the ferrule sections 5. For such previous formation of the optical waveguide section 4, a resin material identical with that for the over cladding layer 3 in the ferrule sections 5 or a formation material at least identical in refractive index with the over cladding layer 3 in the ferrule sections 5 and high in compatibility with and adherence to the resin material of the ferrule sections 5 is used.

For the formation of the over cladding layer 3, another method to be described below may be used. Specifically, the mold 12 is previously placed and positioned on the substrate 11 with respect to the position of the cores 1 or the alignment marks. In this state, the material for the formation of the over cladding layer 3 (liquid resin) is poured into the mold space surrounded by the inner mold surfaces of the mold 12 and the surface of the substrate 11, and is cured therein. For the production of the cores 1, a cast molding process similar to that for the over cladding layer 3 may be used.

Next, a third preferred embodiment will be described. FIG. 6 is a view illustrating a structure of optical connectors 30 and 30' and a method of connecting the optical connectors 30 and 30' to each other according to the third preferred embodiment.

The optical connectors 30 and 30' according to the third preferred embodiment differ from the optical connectors 10 and 10' according to the first preferred embodiment in that coupling means for facilitating the operation of aligning the optical connectors 30 and 30' with each other and the operation of coupling the optical connectors 30 and 30' to each other are provided in the upper surfaces of ferrule sections 6 and 6'. Such a structure saves time and effort in the alignment operation to allow optical connection with low coupling losses more easily and quickly, and also eliminates the need for the fastening member, such as the clamp spring 14 and the locking member. Other parts of the third preferred embodiment including a manufacturing method thereof are substantially similar to those of the first preferred embodiment.

Specifically, as shown in FIG. 6, the ferrule sections 6 and 6' formed by making parts of the over cladding layer 3 thick-walled in the optical connectors 30 and 30' include alignment grooves 6d and 6d' (alignment means) of a rectangular cross-sectional configuration which are formed in predetermined positions of the upper surfaces of the ferrule sections 6 and 6' and extend to the front end edges of the ferrule sections 6 and 6'. The ferrule sections 6 and 6' further include vertically extending coupling holes 6e and 6e' (coupling means) provided in the bottom portions of closed ends of the alignment grooves 6d and 6d'.

Coupling pins 16 (coupling members) used for coupling the ferrule sections 6 and 6' to each other are of a substantially inverted U-shaped or iron-clamp-shaped configuration comprised of a straight portion 16a (alignment function portion) extending in a longitudinal direction, and vertically extending flange portions 16b (fastening function portions) provided on opposite ends of the straight portion 16a.

The optical connectors 30 and 30' are coupled to each other in a manner to be described below. As in the first preferred embodiment, front end surfaces 6a and 6a' of the respective ferrule sections 6 and 6' are brought into abutment with each other. The flange portions 16b on the opposite ends of the coupling pins 16 are inserted into the coupling holes 6e and 6e' respectively, and the straight portions 16a of the coupling pins 16 are fitted into the alignment grooves 6d and 6d'. Thus, the optical axes of the cores 1 in the optical waveguides in the optical connectors 30 and 30' are aligned with each other, and the optical connectors 30 and 30' are coupled and fixed to each other.

In FIG. 6, the reference characters 6b and 6b' designate lateral side surfaces of the ferrule sections 6 and 6'. Unlike the first and second preferred embodiments, the lateral side surfaces 6b and 6b' are flush with the side surfaces of the optical waveguide section 4. In other words, the ferrule sections 6 and 6' have a width equal to that of the optical waveguide section 4. This structure allows the ferrule sections 6 and 6' to be smaller in width. The ferrule section 6 having the coupling holes 6e is produced easily by changing the configuration of the mold surfaces of the mold 12 used for the molding of the over cladding layer 3 in the method of manufacturing an optical connector in the first preferred embodiment.

Figure 7:
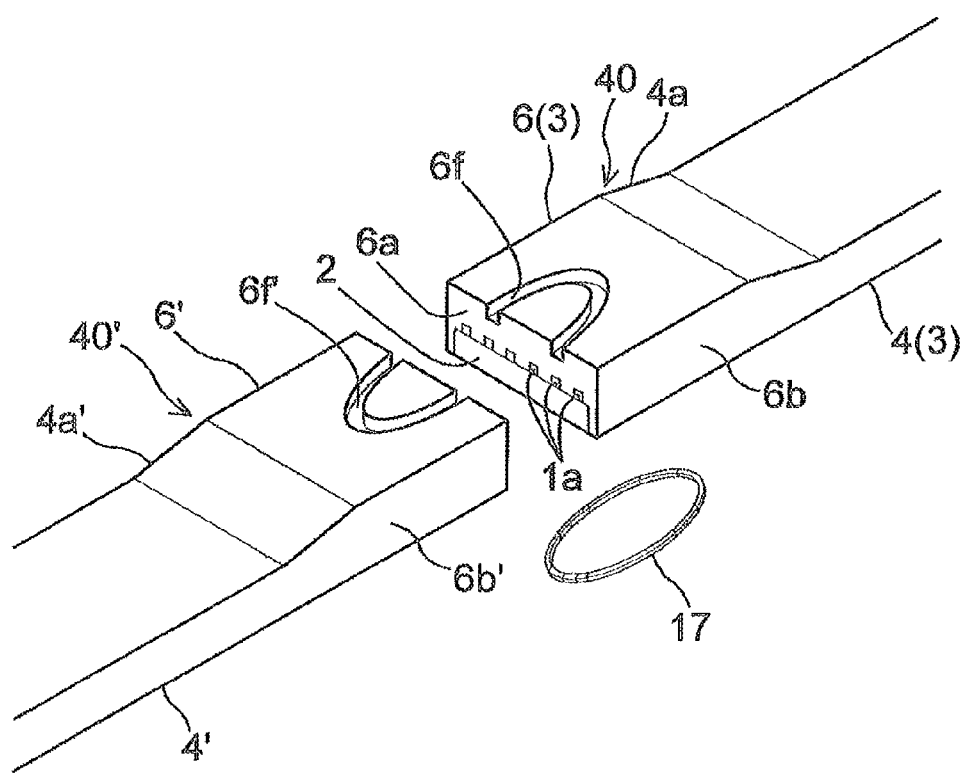
FIG. 7 is a view schematically illustrating a structure of optical connectors according to a fourth preferred embodiment of the present invention.
Figure 8:
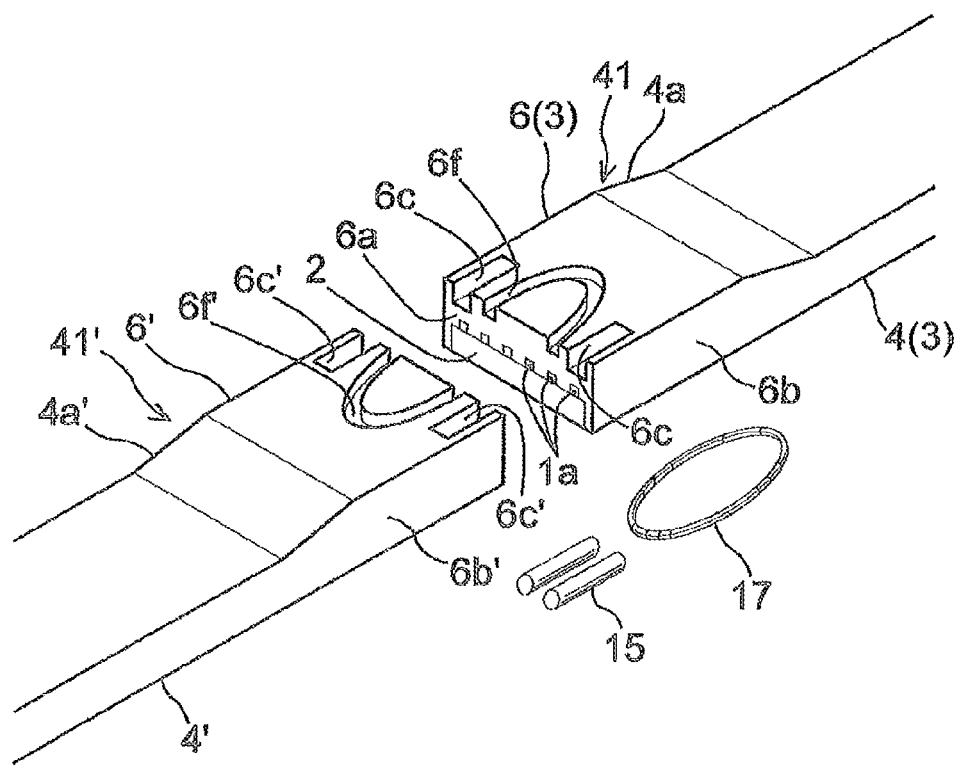
FIG. 8 is a view schematically illustrating a structure of optical connectors according to a fifth preferred embodiment of the present invention.

Next, fourth and fifth preferred embodiments, which correspond to modifications of the third preferred embodiment, will be described. FIG. 7 is a view illustrating a structure of optical connectors 40 and 40' and a method of connecting the optical connectors 40 and 40' to each other according to the fourth preferred embodiment. FIG. 8 is a view illustrating a structure of optical connectors 41 and 41 and a method of connecting the optical connectors 41 and 41' to each other according to the fifth preferred embodiment.

The optical connectors 40 and 40' according to the fourth preferred embodiment and the optical connectors 41 and 41' according to the fifth preferred embodiment differ from the optical connectors 30 and 30' according to the third preferred embodiment in that coupling grooves 6f and 6f' of a U-shaped (substantially horseshoe-shaped) plan configuration are provided as coupling means for coupling the ferrule sections 6 and 6' to each other.

As shown in FIG. 7, the ferrule sections 6 and 6' in the optical connectors 40 and 40' according to the fourth preferred embodiment include the coupling grooves 6f and 6f' which are formed in predetermined positions of the upper surfaces of the respective ferrule sections 6 and 6' and which serve as both alignment means and coupling means. The coupling grooves 6f and 6f' are configured to form an elliptic continuous groove in the upper surfaces of the ferrule sections 6 and 6' when the front ends of the ferrule sections 6 and 6' are in abutment with each other.

A coupling ring 17 (a coupling member) used for coupling the optical connectors 40 and 40' to each other is an annular member made of elastic rubber or resin or made of metal and the like. The optical connectors 40 and 40' are coupled together in a manner to be described below. The front end surfaces 6a and 6a' of the respective ferrule sections 6 and 6' are brought into abutment with each other. Then, the coupling ring 17 is fitted into the coupling grooves 6f and 6f'. Thus, while the optical axes of the cores 1 in the optical waveguides in the optical connectors 40 and 40' are aligned with each other, the optical connectors 40 and 40' are coupled and fixed to each other. In other words, the coupling ring 17 also has both the alignment function and the fastening function.

As shown in FIG. 8, the ferrule sections 6 and 6' in the optical connectors 41 and 41' according to the fifth preferred embodiment include alignment grooves 6c and 6c' which are formed in predetermined positions of the upper surfaces of the respective ferrule sections 6 and 6' and which are similar to those of the first preferred embodiment, in addition to the coupling grooves 6f and 6f'. Such a structure saves time and effort in the alignment operation to allow optical connection with low coupling losses more easily and quickly, as in the first to third preferred embodiments.

As in the first preferred embodiment, the aforementioned connection may be made firmer when an adhesive or the like is previously applied to the alignment grooves 6c and 6c', the alignment grooves 6d and 6d', the coupling holes 6e and 6e', the coupling grooves 6f and 6f' and the like also in the third to fifth preferred embodiments. The cross-sectional configuration of the aforementioned grooves and holes may be a V-shaped configuration, a U-shaped configuration and the like in addition to the rectangular configuration.

Next, description will be given on exemplary structures of optical connectors in which the outside shape of the ferrule sections 5 according to the first and second preferred embodiments is changed to eliminate the need for the alignment members (the guide pins 15), the coupling members (the coupling pins 16 and the coupling ring 17), and the fastening members (the clamp springs 14 and 102) which have been required for the coupling of the optical connectors in the aforementioned preferred embodiments.

Figure 9A:
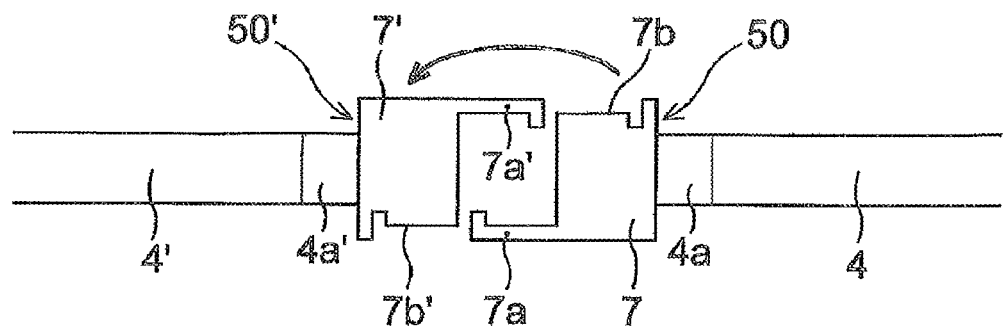
FIGS. 9A and 9B are views illustrating a structure of optical connectors and a method of connecting the optical connectors to each other according to a sixth preferred embodiment of the present invention.
Figure 9B:
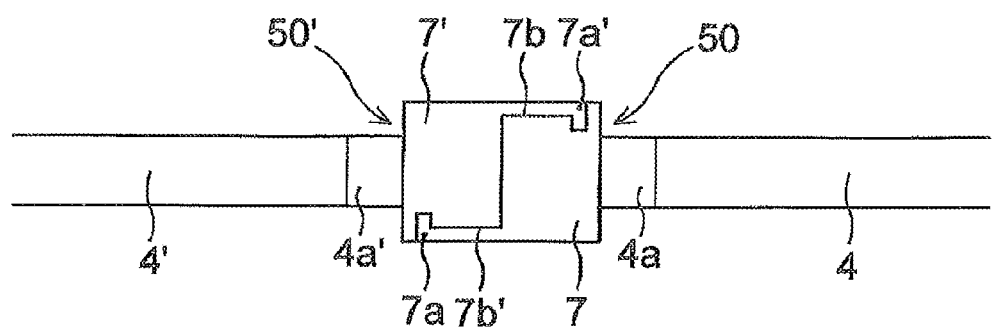

FIGS. 9A and 9B are views illustrating a structure of optical connectors and a method of connecting the optical connectors to each other according to a sixth preferred embodiment of the present invention. FIG. 10, FIG. 11, and FIGS. 12A to 12C are views illustrating structures of optical connectors and methods of connecting the optical connectors to each other according to seventh, eighth, and ninth preferred embodiments, respectively.

Optical connectors 50, 51, 52 and 60 according to the sixth to ninth preferred embodiments differ structurally from the optical connectors 10, 20, 30, 40 and 41 according to the first to fifth preferred embodiments in that a ferrule section 7 itself includes an engaging portion (7a, 7c, 7e and 7g) and a to-be-engaged portion (7b, 7d, 7f and 7h) which are engageable with a ferrule section (or a ferrule) of another optical connector.

Specifically, as shown in FIG. 9A, the optical connector 50 according to the sixth preferred embodiment indludes an L-shaped engaging piece 7a (an engaging portion) and an inverted L-shaped engaging recessed portion 7b (a to-be-engaged portion) which are provided on lateral side portions of the ferrule section 7 and which are engageable with corresponding portions of a ferrule section 7' of another optical connector 50'. For the connection of the optical connectors 50 and 50', it is only necessary to fit the ferrule section 50 to the corresponding ferrule section 50' as shown in FIG. 9A, whereby protruding portions of the engaging pieces 7a and 7a' are fitted into and come into engagement with the engaging recessed portions 7b' and 7b, respectively. Thus, the optical axes of the cores 1 in the optical waveguides in the optical connectors 50 and 50' are aligned with each other, and the optical connectors 50 and 50' are coupled and fixed to each other while being held in alignment. This also saves time and effort in the alignment operation to allow optical connection with low coupling losses more easily and quickly.

Figure 10:
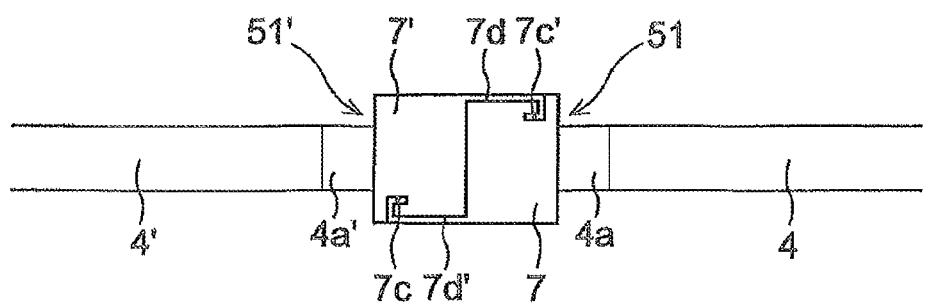
FIG. 10 is a view schematically illustrating a structure of optical connectors according to a seventh preferred embodiment of the present invention.
Figure 11:
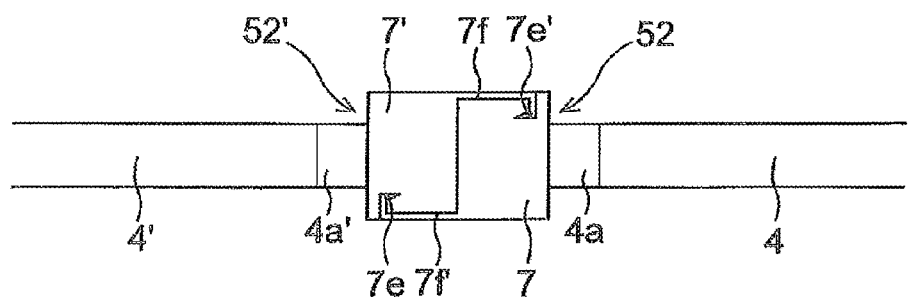
FIG. 11 is a view schematically illustrating a structure of optical connectors according to an eighth preferred embodiment of the present invention.

The optical connectors 51 and 51' shown in FIG. 10 according to the seventh preferred embodiment and the optical connectors 52 and 52' shown in FIG. 11 according to the eighth preferred embodiment are modifications of the optical connectors 50 and 50' according to the sixth preferred embodiment described above. A "barb" portion serving as a retention (for preventing the disengagement) of each of the L-shaped engaging pieces (7a and 7a') is provided in the front end portion of each of the L-shaped engaging pieces (7a and 7a'). In such structures, it is only necessary to fit the ferrule sections 51 and 52 to the corresponding ferrule sections 51' and 52' respectively, whereby the front-end barb portions of engaging pieces 7c, 7c', 7e and 7e' are fitted into and come into tight engagement with engaging recessed portions 7d, 7d, 7f and 7f, respectively. Thus, the optical axes of the cores 1 in the optical waveguides in the optical connectors 51 and 51' or the optical connectors 52 and 52' are aligned with each other. The optical connectors 51 and 51' or the optical connectors 52 and 52' are coupled and fixed to each other while being held in alignment.

Figure 12A:
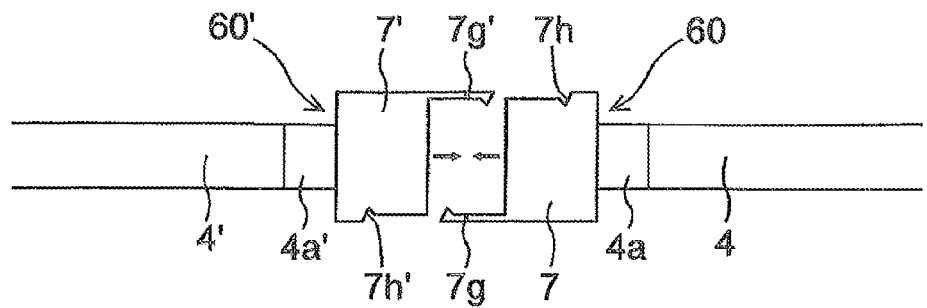
FIGS. 12A to 12C are views illustrating a structure of optical connectors and a method of connecting the optical connectors to each other according to a ninth preferred embodiment of the present invention.
Figure 12B:
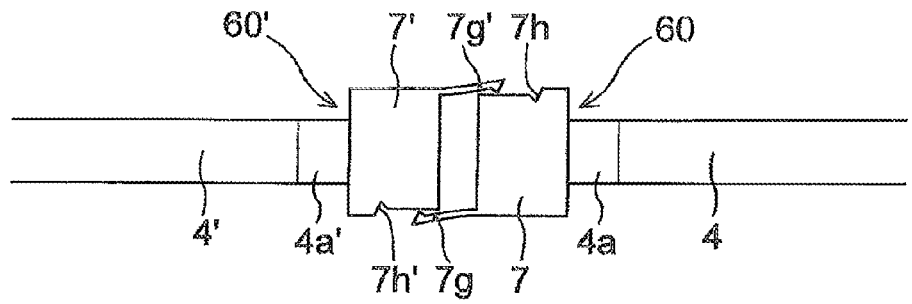
Figure 12C:
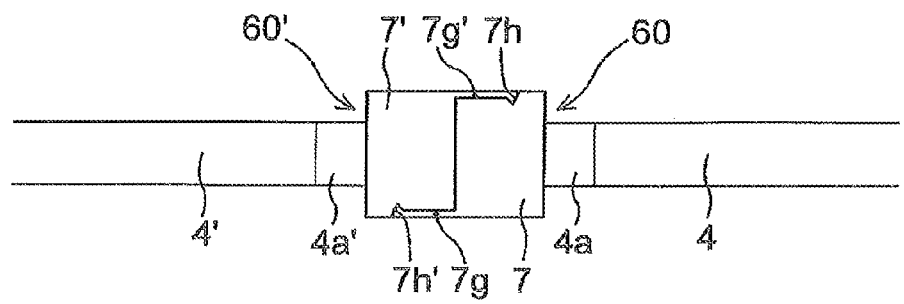

The ninth preferred embodiment shown in FIGS. 12A to 12C is configured such that it is only necessary to butt the ferrule sections 7 and 7' in opposed relation against each other, whereby the optical connectors 60 and 60' are coupled to each other. The optical connectors 60 and 60' include engaging pieces 7g and 7g' each having a substantially triangular front end portion.

The optical connectors 60 and 60' are coupled to each other in a manner to be described below. As shown in FIG. 12A, the front end surfaces (coupling surfaces) of the respective ferrule sections 7 and 7' are placed in opposed relation. As shown in FIG. 12B, the front end surfaces (coupling surfaces) of the respective ferrule sections 7 and 7' held in opposed relation are brought closer together into abutment with each other. Then, protruding portions of the engaging pieces 7g and 7u' of the ferrule sections 7 and 7' are fitted into and come into engagement with engaging recessed portions 7h' and 7h of the corresponding ferrule sections 7' and 7, respectively, as shown in FIG. 12C. Thus, the optical axes of the cores 1 in the optical waveguides in the optical connectors 60 and 60' are aligned with each other, and the optical connectors 60 and 60' are coupled and fixed to each other while being held in alignment. This also saves time and effort in the alignment operation to allow optical connection with low coupling losses more easily and quickly.

Figure 16:
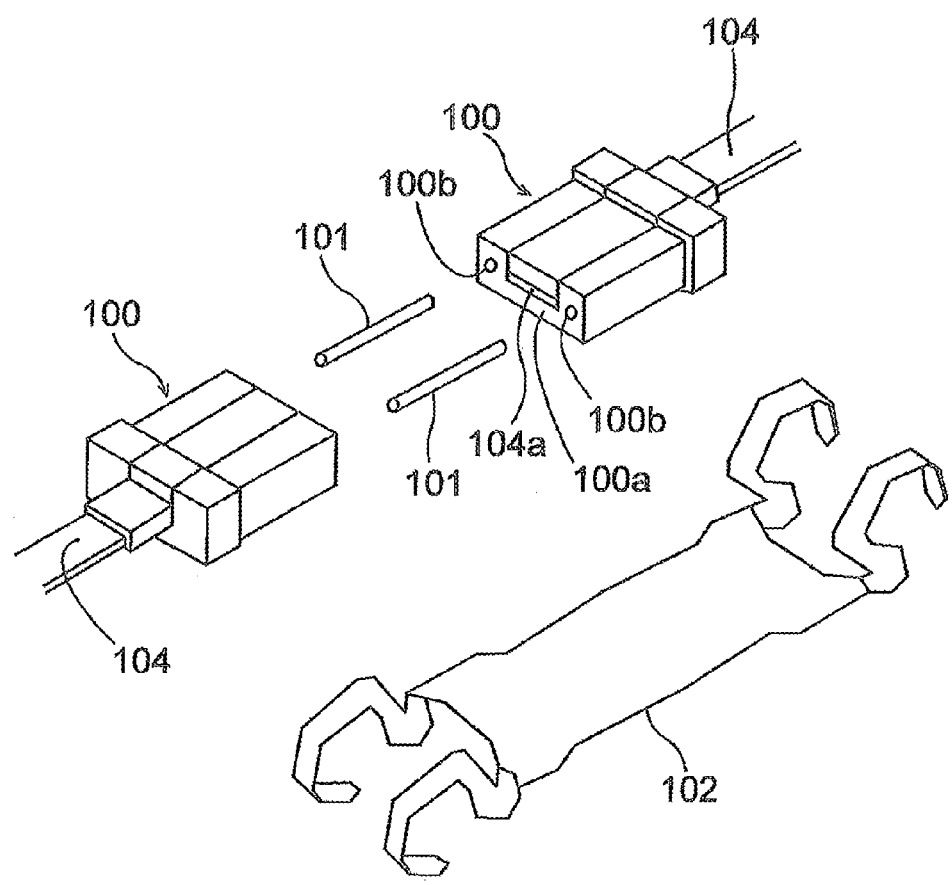
FIG. 16 is a view illustrating a structure of conventional optical connectors and a method of connecting the conventional optical connectors to each other.

Next, description will be given on exemplary structures of optical connectors in which the outside shape of the ferrule sections 5 according to the first and second preferred embodiments is changed to enable connection to general-purpose ferrules (MT ferrules for connection to optical fibers or PMT ferrules for connection to optical waveguides) shown in FIG. 16.

Figure 13A:
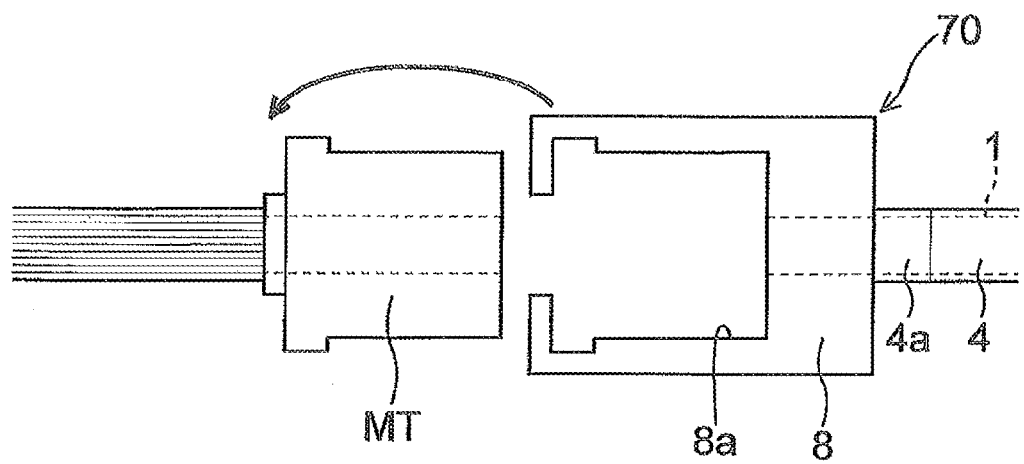
FIGS. 13A and 13B are views illustrating a structure of an optical connector and a method of connecting the optical connector according to a tenth preferred embodiment of the present invention.
Figure 13B:
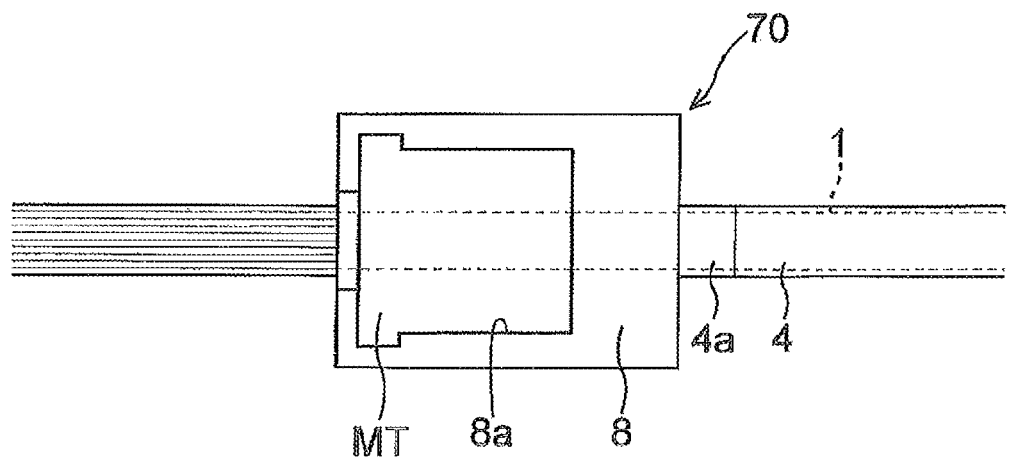
Figure 14:
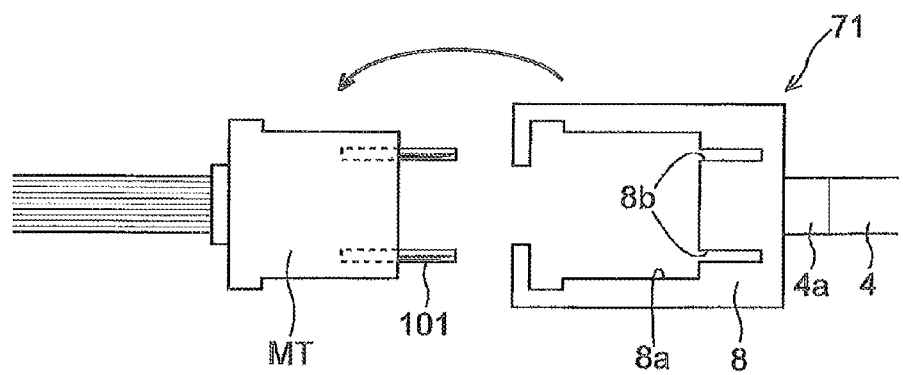
FIG. 14 is a view illustrating a structure of an optical connector and a method of connecting the optical connector according to an eleventh preferred embodiment of the present invention.
Figure 15A:
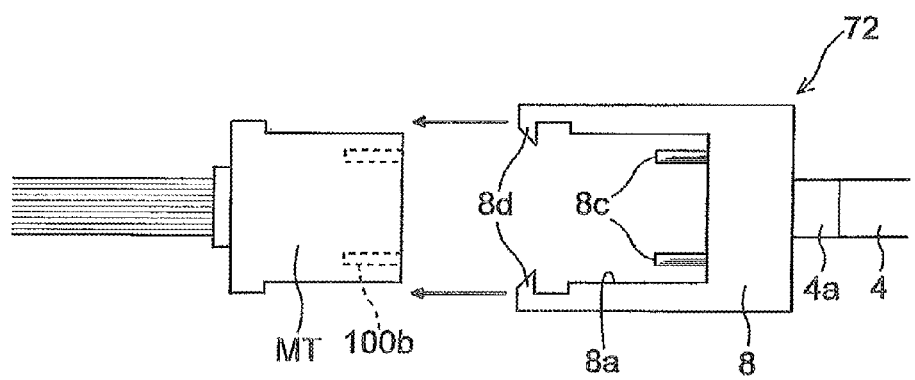
FIGS. 15A and 15B are views illustrating a structure of an optical connector and a method of connecting the optical connector according to a twelfth preferred embodiment of the present invention.
Figure 15B:
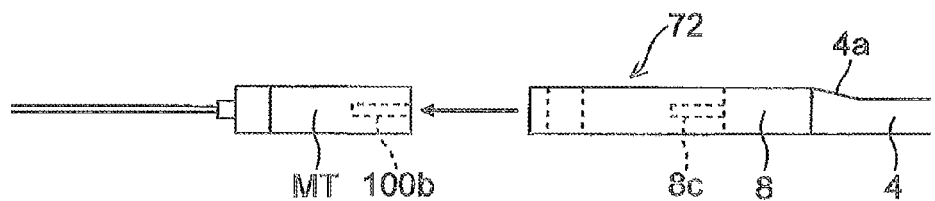

FIGS. 13A and 13B are views illustrating a structure of an optical connector 70 and a method of connecting the optical connector 70 according to a tenth preferred embodiment. FIG. 14 and FIGS. 15A and 15B are views illustrating structures of optical connectors 71 and 72 and methods of connecting the optical connectors 71 and 72 according to eleventh and twelfth preferred embodiments, respectively.

The optical connector 70 according to the tenth preferred embodiment shown in FIGS. 13A and 13B is for connection to a commercially available general-purpose optical connector MT. The optical connector 70 includes a ferrule section 8 having inner surfaces 8a extending along the outside shape of the general-purpose optical connector MT. For the connection of the optical connector 70 to the general-purpose optical connector MT for an optical fiber, the ferrule section 8 is fitted over the general-purpose optical connector MT in a vertical direction, as shown in FIG. 13A. Thus, the optical axes of the cores in the optical waveguide in the optical connector 70 and cores in the general-purpose optical connector MT are aligned with each other, and the optical connector 70 and the general-purpose optical connector MT are coupled to each other, as shown in FIG. 13B.

The ferrule section 8 having the inner surfaces 8a extending along the outside shape of the general-purpose optical connector MT is produced by changing the configuration of the inner mold surfaces of the mold 12 used for the method of manufacturing an optical connector as in the first preferred embodiment. Also, the inner surfaces 8a of the ferrule section 8 are configured preferably to fit over the outline of the general-purpose optical connector MT without any space therebetween, more preferably to fit thereover like a socket-and-spigot joint.

Next, the optical connector 71 according to the eleventh preferred embodiment enables connection to the general-purpose optical connector MT, with guide pins 101 (with reference to FIG. 16) inserted in guide holes (not shown). As shown in FIG. 14, grooves 8b corresponding to protruding portions of the guide pins 101 are provided in the inner surfaces 8a extending along the outside shape of the general-purpose optical connector MT. The grooves 8b are in the form of slits extending vertically through the ferrule section 8 so as to allow the guide pins 101 to be inserted therein in upward and downward directions, and have a width and a length (depth) which are slightly greater than the dimensions of the outside shape of the protruding portions of the guide pins 101.

Such a structure allows the optical connector 71 to be fitted in a vertical direction over the general-purpose optical connector MT with the guide pins 101 inserted therein. Thus, the optical connector 71 and the general-purpose optical connector MT are coupled and fixed to each other while the optical axes of the cores are held in alignment. This also saves time and effort in the alignment operation to allow optical connection with low coupling losses more easily and quickly.

The optical connector 72 according to the twelfth preferred embodiment shown in FIGS. 15A and 15B is configured to use guide holes 100b (with reference to FIG. 16) for purposes of alignment and coupling. The guide holes 100b are provided for fitting engagement with the guide pins (101) in the general-purpose optical connector MT. Two pin-shaped protruding portions 8c are provided on the inner surfaces 8a of the ferrule section 8, and are disposed in positions corresponding to the respective guide holes 100b of the general-purpose optical connector MT. The pin-shaped protruding portions 8c are made of the material for the formation of the over cladding layer and formed integrally with the over cladding layer when the over cladding layer of the ferrule section 8 is formed (molded). Each of the pin-shaped protruding portions 8c is of a rod-shaped, semicircular cross-sectional configuration (i.e., a semicylindrical configuration).

The optical connector 72 having such a structure is coupled to the general-purpose optical connector MT in a manner to be described below. The ferrule section 8 of the optical connector 72 is placed in opposed relation to the ferrule of the general-purpose optical connector MT in a manner similar to the optical connectors 60 (with reference to FIG. 12A) of the ninth preferred embodiment. In this state, the general-purpose optical connector MT is forced into the ferrule section 8, whereby engaging pieces 8d of the ferrule section 8 are fitted over a proximal end portion of the general-purpose optical connector MT. Thus, the general-purpose optical connector MT and the optical connector 72 are coupled and fixed to each other while being held in alignment. This also saves time and effort in the alignment operation to allow optical connection with low coupling losses more easily and quickly.

As shown in FIGS. 15A and 15B, the pin-shaped protruding portions 8c extend to near the center of the inner surfaces 8a of the ferrule section 8 in a direction of the thickness (height) of the innermost part (right-hand part as seen in the figures) of the inner surfaces 8a, and are disposed in corresponding relation to the position of the guide holes 100b of the general-purpose optical connector MT. The configuration of the pin-shaped protruding portions 8c may be a prism, a cylinder, and the like, in addition to the aforementioned rod-shaped semicircular cross-sectional configuration, when the pin-shaped protruding portions 8c are configured to be insertable into the guide holes 100b.

Examples of the materials for the formation of the cladding layers and the cores for use in the production of the optical connectors (and the optical waveguides) according to the aforementioned preferred embodiments include photosensitive resins (photopolymerizable resins) such as epoxy resins, polyimide resins, acrylic resins, methacrylic resins, oxetanes, and silicone resins. The photopolymerizable resins together with a photocatalyst such as a photo-acid generator, a photo-base generator, and a photo-radical polymerization initiator constitute a photopolymerizable resin composition. The photopolymerizable resin composition may contain other components including a reactive oligomer, a diluent, and a coupling agent.

Examples of the photo-acid generator include compounds of onium salts, metallocene complexes and the like. Examples of the onium salts include diazonium salts, sulfonium salts, iodonium salts, phosphonium salts, and selenium salts. Examples of counterions of these salts include anions such as $CF_3SO_3^-$, $BF_4^-$, $PF_6^-$, $AsF_6^-$, and $SbF_6^-$. Specific examples include triphenylsulfonium triflate, 4-chlorobenzene diazonium hexafluorophosphate, triphenylsulfonium hexafluoroantimonate, triphenylsulfonium hexafluorophosphate, (4-phenylthio-phenyl)diphenyl sulfonium hexafluoroantimonate, (4-phenylthio-phenyl)diphenyl sulfonium hexafluorophosphate, bis[4-(diphenyl sulfonio)phenyl]sulfide-bis-hexafluoroantimonate, bis[4-(diphenyl sulfonio)phenyl]sulfide-bis-hexafluorophosphate, (4-methoxyphenyl) diphenyl sulfonium hexafluoroantimonate, (4-methoxyphenyl) phenyl iodonium hexafluoroantimonate, bis(4-t-butylphenyl)iodonium hexafluorophosphate, benzyltriphenylphosphonium hexafluoroantimonate, and triphenylselenium hexafluorophosphate. These compounds are used either singly or in combination.

Examples of the reactive oligomer include fluorene derivative type epoxies, many other epoxies, epoxy (meth)acrylates, urethane acrylates, butadiene acrylates, and oxetanes. In particular, oxetanes are preferable because of their effect of accelerating the hardening of polymerizable mixtures by the addition of only small amounts thereof. Examples of the oxetanes include 3-ethyl-3-hydroxymethyl oxetane, 3-ethyl-3-(phenoxymethyl)oxetane, di(1-ethyl(3-oxetanyl))methyl ether, and 3-ethyl-3-(2-ethylhexylomethyl)oxetane {3-ethyl-3-(2-ethylhexylmethyl)oxetane}. These reactive oligomers are used either singly or in combination.

Examples of the diluent include alkyl monoglycidyl ethers with a carbon number in the range of 2 to 25, such as butyl glycidyl ether and 2-ethylhexyl glycidyl ether, butanediol diglycidyl ether, 1,6-hexanediol diglycidyl ether, neopentyl glycol diglycidyl ether, dodecanediol diglycidyl ether, pentaerythritol polyglycidyl ether, trimethylolpropane polyglycidyl ether, glycerol polyglycidyl ether, phenyl glycidyl ether, resorcinol glycidyl ether, p-tert-butylphenyl glycidyl ether, allyl glycidyl ether, tetrafluoropropyl glycidyl ether, octafluoropropyl glycidyl ether, dodecafluoropentyl glycidyl ether, styrene oxide, 1,7-octadiene diepoxide, limonene diepoxide, limonene monoxide, α-pinene epoxide, β-pinene epoxide, cyclohexene epoxide, cyclooctene epoxide, and vinylcyclohexene oxide.

Examples of the diluent preferable from the viewpoints of heat resistance and transparency include epoxies having an alicyclic structure in the molecules, such as 3,4-epoxycyclohexenylmethyl-3',4'-epoxycyclohexene carboxylate, 3,4-epoxycyclohexenylethyl-8,4-epoxycyclohexene carboxylate, vinylcyclohexene dioxide, allylcyclohexene dioxide, 8,4-epoxy-4-methylcyclohexyl-2-propylene oxide, and bis(3,4-epoxycyclohexyl)ether. Mixing suitable amounts of these diluents with epoxy resins serving as a base compound increases the reaction rate of the epoxy groups to consequently improve the heat resistance of the resultant hardened material and the flexibility thereof as a film.

The coupling agent used herein includes epoxy-based coupling agents. Examples of the epoxy-based coupling agents include 2-(3,4-epoxycyclohexyl)ethyltrimethoxysilane, 3-glycidoxypropyltrimethoxysilane, 3-glycidoxypropyl methyldiethoxysilane, and 3-glycidoxypropyltriethoxysilane. Also, amino-based coupling agents may be used, such as 3-aminopropyltrimethoxysilane, and 3-aminopropyltriethoxysilane.

In consideration of the increase or decrease in size after the molding, it is preferable that the photopolymerizable resin composition serving as the material for the formation of the cladding layers does not contain a viscosity-adjusting solvent (an organic solvent that does not react with the photosensitive resin serving as a base compound but has only the functions of swelling and plasticizing the resin). For example, when an epoxy resin is used, the use of an epoxy monomer in liquid form in place of the aforementioned solvent makes the material for the formation of the over cladding layer solvent-free. Examples of the epoxy monomer in liquid form include Celloxide 2021P available from Daicel Chemical Industries, Ltd., Celloxide 2081 available from Daicel Chemical Industries, Ltd., and ADEKA RESIN EP-4080E available from ADEKA Corporation. Using these epoxy monomers in liquid form, the epoxy resins in solid form or in viscous liquid form are dissolved and made solvent-free.

EXAMPLES

Next, inventive examples of the present invention will be described. It should be noted that the present invention is not limited to the inventive examples.

Prior to the inventive examples, materials for use in the inventive examples were prepared.

Material for Formation of Under Cladding Layer

Component A: 100 parts by weight of an epoxy resin containing an alicyclic skeleton (EHPE 3150 available from Daicel Chemical Industries, Ltd.).

Component B: (a photo-acid generator) two parts by weight of a 50% propione carbonate solution of a triaryl sulfonium salt (CPI-200K available from San-Apro Ltd.).

A material (a photopolymerizable resin composition) for the formation of an under cladding layer was prepared by stirring to dissolve these components in 100 parts by weight of cyclohexanone (available from Wako Pure Chemical Industries, Ltd.).

Material for Formation of Cores

Component C: 40 parts by weight of an epoxy resin containing a fluorene skeleton (OGSOL EG available from Osaka Gas Chemicals Co., Ltd.).

Component D: 30 parts by weight of an epoxy resin containing a fluorene skeleton (EX-1040 available from Nagase ChemteX Corporation).

Component E: 30 parts by weight of an oxetane resin (1,3,3-tris(4-(2-(3-oxetanyl) butoxyphenyl)butane) available from Nitta Denko Corporation).

A material (a photopolymerizable resin composition) for the formation of cores was prepared by stirring to dissolve these components in 40 parts by weight of ethyl lactate (available from Musashino Chemical Laboratory, Ltd.).

Material for Formation of Over Cladding Layer

Component F: 50 parts by weight of an epoxy resin containing an alicyclic skeleton (EP-4080E available from ADEKA Corporation).

Component G: 10 parts by weight of an oxetane resin (OXT-221 available from Toagosei Co., Ltd.).

Component H: 20 parts by weight of an epoxy resin containing an alicyclic skeleton (EP-4080S available from ADEKA Corporation).

Component I: 20 parts by weight of a silicone resin (Shin-Etsu Silicone X-22-163 available from Shin-Etsu Chemical Co., Ltd.).

A material (a photopolymerizable resin composition) for the formation of an over cladding layer was prepared by stirring to dissolve these components.

Inventive Example 1

In Inventive Example 1, a ferrule section having straight alignment grooves (5c) which was similar to that of the aforementioned first preferred embodiment was formed in each end portion of an optical waveguide section.

This provided an optical connector in Inventive Example (with reference to FIGS. 1A to 1D, 2, 3, 4A1 to 4A6, and 4B1 to 4B6).

Production of Under Cladding Layer

First, the material for the formation of the under cladding layer was applied to a surface of a glass substrate (available from Central Glass Co., Ltd., and measuring 1.1 mm in thickness and 140 mm per side) with a spin coater (1X-DX2 available from Mikasa Co., Ltd.). Thereafter, a drying process was performed at 100° C. for five minutes on the material for the formation of the under cladding layer. Then, the material was exposed to mixed irradiation at a dose of 2000 mJ/cm$^2$ (using an exposure machine (MA-60F available from Mikasa Co., Ltd.) and an ultra-high-pressure mercury-vapor lamp (USE-250D available from Ushio Inc.)) through a quartz photomask M1. The quartz photomask M1 had an opening of a rectangular pattern corresponding to the under cladding layer, and two spaced openings of a pattern corresponding to annular alignment marks A (having a diameter of 1 mm and a width of 50 μm) and disposed in a line parallel to the longitudinal direction (the direction of the long side) of the rectangular opening. Subsequently, a heating treatment was performed at 100° C. for five minutes. Next, dip development was performed for three minutes using γ-butyrolactone (available from Mitsubishi Chemical Corporation) to dissolve away unexposed portions of the material. Thereafter, a heating treatment was performed at 120° C. for 10 minutes to form the under cladding layer and the two annular alignment marks A on the substrate. A cross-sectional dimension of the resultant under cladding layer was 25 μm in thickness when measured under a digital microscope (VHX-200 available from Keyence Corporation).

Production of Cores

Next, the material for the formation of the cores was applied to a surface of the under cladding layer with a spin coater (1X-DX2 available from Mikasa Co., Ltd.). Thereafter, a drying process was performed at 130° C. for 10 minutes on the material for the formation of the cores. Then, a quartz photomask M2 was prepared which had openings of a pattern (including 12 cores each having a length of 101 mm and a width of 50 μm, and disposed at spacings of 200 μm) corresponding to the straight cores parallel to each other in the longitudinal direction, and two spaced openings of a pattern corresponding to cross-shaped alignment marks B (having a length of 1 mm and a width of 50 μm) and disposed in a line parallel to the longitudinal direction of the openings of the core pattern. The quartz photomask M2 was placed over the under cladding layer, and was positioned so that the pattern corresponding to the cross-shaped alignment marks B fell within the range of the annular alignment marks A.

Then, the material was exposed to 365-nm irradiation at a dose of 4000 mJ/cm$^2$ (using an exposure machine (MA-60F available from Mikasa Co., Ltd.) and an ultra-high-pressure mercury-vapor lamp (USH-250D available from Ushio Inc.)) through the quartz photomask M2. Subsequently, a heating treatment was performed at 130° C. for 10 minutes. Next, dip development was performed for three minutes using γ-butyrolactone (available from Mitsubishi Chemical Corporation) to dissolve away unexposed portions of the material. Thereafter, a heating treatment was performed at 150° C. for 10 minutes to form the multiple cores and the two cross-shaped alignment marks B (within the range of the annular alignment marks A). Cross-sectional dimensions of the resultant cores were 50 μm in width and 50 μm in height when measured under a digital microscope (VHX-200 available from Keyence Corporation).

Production of Over Cladding Layer

A mold made of quartz for the formation of the over cladding layer was prepared. The mold had a recessed portion (a mold cavity) defined by an inner mold surface and corresponding to the ferrule sections and the optical waveguide section, and alignment marks C provided in predetermined positions around the recessed portion. While being positioned upward, the recessed portion of the mold was coated and filled with the material for the formation of the over cladding layer. The glass substrate with the under cladding layer and the cores formed thereon was placed on the mold, with the pattern positioned downward. The positions of the alignment marks C provided in the mold were image-recognized using a camera. The cross-shaped alignment marks B were overlaid on the alignment marks C. Thus, the positioning of the mold was accurately performed in the horizontal direction. Then, the glass substrate was brought into intimate contact with the mold. In this state, the cores and the under cladding layer were entirely buried in the material for the formation of the over cladding layer which filled the recessed portion (a mold space).

Next, the material for the formation of the over cladding layer was exposed to 365-nm irradiation at a dose of 1000 mJ/cm$^2$ (using an exposure machine (MA-60F available from Mikasa Co., Ltd.) and an ultra-high-pressure mercury-vapor lamp (USH-250D available from Ushio)) through the mold. Thereafter, a heating treatment was performed at 130° C. for 10 minutes. This completed the curing of the over cladding layer. Thereafter, the mold was removed. This provided an optical connector in which the ferrule sections comprised of the thick-walled portions of the over cladding layer were integrally molded in the longitudinal end portions of the optical waveguide section. The ferrule sections of the provided optical connector were 1 mm in height (thickness).

End Surface Machining of Ferrule Sections

The optical waveguide produced as mentioned above was stripped from the glass substrate, and the optical waveguide section integral with the ferrule sections was affixed to a dicing tape (UE-111AJ available from Nitto Denko Corporation). The over cladding layer near the longitudinal ends thereof, together with the cores and the under cladding layer, was cut by dicing using a dicing device (DAD522 available from Disco Corporation) and a dicing blade (NBS-ZB1110S3 available from Disco Corporation and having dimensions of 53.0×0.200×40 mm) at a cutting speed of 0.3 mm per second, so that the length (the whole length) of the optical connector was adjusted to a desired length and so that the longitudinal end surfaces (the optical connection surfaces) of the cores were uncovered. In this manner, the optical connector was provided in Inventive Example 1.

Inventive Example 2

In Inventive Example 2, the mold for the formation of the over cladding layer (the configuration of the mold space) was changed, so that a ferrule section similar to that of the third preferred embodiment and including alignment grooves (6d) and coupling holes (6e) was formed in each end portion of an optical waveguide section. Except for these differences, an optical connector in Inventive Example 2 was produced (with reference to FIG. 6) using a method and materials similar to those of Inventive Example 1.

Inventive Example 3

In Inventive Example 3, the mold for the formation of the over cladding layer (the configuration of the mold space) was changed, so that a ferrule section similar to that of the fourth preferred embodiment and including a coupling groove (6f) of a U-shaped plan configuration was formed in each end portion of an optical waveguide section. Except for these differences, an optical connector in inventive Example 3 was produced (with reference to FIG. 7) using a method and materials similar to those of Inventive Example 1.

Inventive Example 4

In Inventive Example 4, the mold for the formation of the over cladding layer (the configuration of the mold space) was changed, so that a ferrule section similar to that of the sixth preferred embodiment and including an engaging portion (7a) and a to-be-engaged portion (7b) was formed in each end portion of an optical waveguide section. The cutting process (dicing) was not performed on the end portions of the respective ferrule sections. Except for these differences, an optical connector in inventive Example 4 was produced (with reference to FIGS. 9A and 9B) using a method and materials similar to those of Inventive Example 1.

Inventive Example 5

In Inventive Example 5, the mold for the formation of the over cladding layer (the configuration of the mold space) was changed, so that a ferrule section similar to that of the seventh preferred embodiment and including an engaging portion (7c) and a to-be-engaged portion (7d) was formed in each end portion of an optical waveguide section. The cutting process (dicing) was not performed on the end portions of the respective ferrule sections. Except for these differences, an optical connector in Inventive Example 5 was produced (with reference to FIG. 10) using a method and materials similar to those of Inventive Example 1.

Inventive Example 6

In Inventive Example 6, the mold for the formation of the over cladding layer (the configuration of the mold space) was changed, so that a ferrule section similar to that of the eighth preferred embodiment and including an engaging portion (7e) and a to-be-engaged portion (7f) was formed in each end portion of an optical waveguide section. The cutting process (dicing) was not performed on the end portions of the respective ferrule sections. Except for these differences, an optical connector in Inventive Example 6 was produced (with reference to FIG. 11) using a method and materials similar to those of Inventive Example 1.

Inventive Example 7

In Inventive Example 7, the mold for the formation of the over cladding layer (the configuration of the mold space) was changed, so that a ferrule section similar to that of the eleventh preferred embodiment and including inner surfaces (8a) extending along the outside shape of a general-purpose optical connector MT and grooves (8b) corresponding to protruding portions of guide pins was formed in each end portion of an optical waveguide section. The cutting process (dicing) was not performed on the ferrule sections. Except for these differences, an optical connector in Inventive Example 7 was produced (with reference to FIG. 14) using a method and materials similar to those of Inventive Example 1.

Inventive Example 8

In Inventive Example 8, the mold for the formation of the over cladding layer (the configuration of the mold space) was changed, so that a ferrule section similar to that of the twelfth preferred embodiment and including inner surfaces (8a) extending along the outside shape of a general-purpose optical connector MT, pin-shaped protruding portions (8c) disposed in positions corresponding to respective guide holes of the general-purpose optical connector MT, and engaging pieces (8d) for engagement with a proximal end portion of the general-purpose optical connector MT was formed in each end portion of an optical waveguide section. The cutting process (dicing) was not performed on the ferrule sections. Except for these differences, an optical connector in inventive Example 8 was produced (with reference to FIGS. 15A and 15B) using a method and materials similar to those of Inventive Example 1.

Evaluation of Performance of Optical Connector

Experiments for verifying the establishment of optical connection were conducted using the optical connectors obtained in Inventive Examples 1 to 8. The optical connector in each of inventive Examples 1 to 6 was coupled and fixed to an identical optical connector in a manner described in a corresponding one of the preferred embodiments, and was then subjected to such an experiment for verifying the establishment of optical connection. The optical connector in each of Inventive Examples 7 and 8 was coupled and fixed to a ferrule of the general-purpose optical connector (MT), and was then subjected to such an experiment for verifying the establishment of optical connection.

The optical connection between optical connectors was established by a method to be described below. A 850-nm VCSEL (vertical cavity surface emitting laser) was prepared as a light source. Light emitted from the VCSEL was directed through a mode scrambler into the optical waveguide cores or optical fiber cores of one of the optical connectors (in Inventive Examples 7 and 8, the general-purpose optical connector MT). Then, light exiting the optical waveguide cores (the end portion) of the other optical connector because of the optical connection was measured using an optical multi power meter (Q822 available from Advantest Corporation). An optical fiber (GI-MMF with a diameter of 50 μm) was used to guide light in sections (paths) other than the optical waveguides integral with the optical connectors. The light-emitting end portion of the other optical connector for measurement and the optical multi power meter were connected to each other through a condensing lens.

The results of the experiments in all of Inventive Examples 1 to 8 showed that the light exiting the other optical connector was measured, so that the normal optical connection was established.

The optical connector according to the present invention, which is small in size and less expensive, is suitable for use in a location where there is limited space and a large number of optical connectors are used, e.g. around a CPU in a board of a device and around a chip. The method of manufacturing an optical connector is capable of manufacturing an optical connector low in coupling losses and small in size efficiently at low costs.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

What is claimed is:

1. An optical connector comprising:
    an optical waveguide including cores for transmitting light, an under cladding layer provided under the cores, and an over cladding layer provided over the cores; and
    a ferrule section for optical connection provided at each end portion of the optical waveguide,
    wherein said under cladding layer includes a top surface on which the cores are disposed, a bottom surface opposite the top surface, and a pair of side surfaces connecting the top surface and the bottom surface,
    wherein the over cladding layer covers the top surface and the pair of side surfaces of the under claddind layer,
    wherein a width of a part of the over cladding layer covering each of the pair of side surfaces of the under cladding layer in the ferrule sections is greater than a width of a part of the over claddind layer covering each of the pair of side surfaces of the under cladding layer in a portion of the optical waveguide between the ferrule sections, in a direction orthogonal to a longitudinal direction of the cores, and
    wherein the ferrule sections have a greater thickness than the portion of the optical waveguide between the ferrule sections, in a direction orthogonal to the top surface of said under cladding layer.

2. The optical connector according to claim 1, wherein the ferrule section includes coupling means for coupling to a ferrule section of another optical connector.

3. The optical connector according to claim 2,
    wherein the over cladding layer in the ferrule sections and the over cladding layer in the portion of the optical waveguide between the ferrule sections are molded parts,
    wherein the under cladding layer is a molded part, and
    wherein the over cladding layer in ferrule sections and the over cladding layer in the portion of the optical waveguide between the ferrule sections are made of the same material, and
    wherein the over cladding layer in ferrule sections and the over cladding layer in the portion of the optical waveguide between the ferrule sections are integral with each other.

4. The optical connector according to claim 1,
    wherein the over cladding layer in the ferrule sections and the over cladding layer in the portion of the optical waveguide between the ferrule sections are molded parts,
    wherein the under cladding layer is a molded part, and
    wherein the over cladding layer in ferrule sections and the over cladding layer in the portion of the optical waveguide between the ferrule sections are made of the same material, and
    wherein the over cladding layer in ferrule sections and the over cladding layer in the portion of the optical waveguide between the ferrule sections are integral with each other.

5. The optical connector according to claim 1, wherein the under cladding layer and the over cladding layer are formed from different materials.

6. A method of manufacturing an optical connector, the optical connector including an optical waveguide, and a ferrule section for optical connection at each end portion of the optical waveguide, the method comprising:
    forming an under cladding layer and cores having a predetermined pattern, the under cladding layer including a top surface on which the cores are disposed, a bottom surface opposite the top surface, and a pair of side surfaces connecting the top surface and the bottom surface, and
    forming an over cladding layer such that the over cladding layer covers the cores, the top surface of the under cladding layer and the pair of side surfaces of the under cladding layer,
    wherein the over cladding layer is formed such that a width of a part of the over cladding layer covering each of the pair of side surfaces of the under cladding layer in the ferrule sections is greater than a width of a part of the over cladding layer covering each of the pair of side surfaces of the under cladding layer in a portion of the optical waveguide between the ferrule sections, in a direction orthogonal to a longitudinal direction of the cores, and
    wherein the ferrule sections have a greater thickness than the portion of the optical waveguide between the ferrule sections, in a direction orthogonal to the top surface of said under cladding layer.

7. The method according to claim 6,
    wherein the ferrule section is formed by molding the over cladding layer by the use of a mold,
    wherein the over cladding layer in the ferrule sections and the over cladding layer in the portion of the optical waveguide lying between the ferrule sections are formed with the same material, and
    wherein the over cladding in the ferrule sections has a greater thickness than the over cladding layer in the portion of the optical waveguide lying between the ferrule sections, in a direction orthogonal to the top surface of said under cladding layer.

8. The method according to claim 6, wherein the ferrule section is formed by:
- applying a material for the formation of the over cladding layer onto the top surface of the under cladding layer with the cores formed thereon;
- putting a mold having an inner mold surface complementary in shape to the surface of the ferrule section over the material for the formation of the over cladding layer while the material is in a semi-cured or uncured state, so that a mold space in the mold is filled with the material; and
- then curing the material.

9. The method according to claim 6, wherein the under cladding layer and the over cladding layer are formed from different materials.

\* \* \* \* \*